United States Patent
Kim et al.

(10) Patent No.: US 9,893,919 B2
(45) Date of Patent: Feb. 13, 2018

(54) TRANSMISSION AND RECEPTION METHOD AND APPARATUS FOR REDUCING PEAK TO AVERAGE POWER RATIO IN ORTHOGONAL FREQUENCY DIVISION MULTIPLEXING SYSTEM

(71) Applicants: Samsung Electronics Co., Ltd, Gyeonggi-do (KR); Postech Academy-Industry Foundation, Gyeongsangbuk-do (KR)

(72) Inventors: Chan-Hong Kim, Gyeonggi-do (KR); Jubum Kim, Seoul (KR); Yeo-Hun Yun, Gyeonggi-do (KR); Minuk Kim, Busan (KR); Eun Ae Lee, Daegu (KR); Joon Ho Cho, Seoul (KR)

(73) Assignees: Samsung Electronics Co., Ltd., Suwon-si, Gyeonggi-do (KR); Postech Academy-Industry Foundation, Pohang-si, Gyeongsangbuk-do (KR)

( * ) Notice: Subject to any disclaimer, the term of this patent is extended or adjusted under 35 U.S.C. 154(b) by 8 days.

(21) Appl. No.: 15/344,490

(22) Filed: Nov. 4, 2016

(65) Prior Publication Data
US 2017/0134205 A1 May 11, 2017

(30) Foreign Application Priority Data
Nov. 5, 2015 (KR) .......................... 10-2015-0155391

(51) Int. Cl.
H04L 27/26 (2006.01)
H04L 27/20 (2006.01)

(52) U.S. Cl.
CPC ...... *H04L 27/2623* (2013.01); *H04L 27/2082* (2013.01)

(58) Field of Classification Search
CPC .................... H04L 27/2623; H04L 27/2082
See application file for complete search history.

(56) References Cited

U.S. PATENT DOCUMENTS

| 6,192,068 | B1 * | 2/2001 | Fattouche ............. H04B 1/707 375/130 |
| 7,924,775 | B2 | 4/2011 | Khan et al. |
| 8,149,969 | B2 | 4/2012 | Khan et al. |
| 8,264,946 | B2 | 9/2012 | Narasimha et al. |

(Continued)

FOREIGN PATENT DOCUMENTS

WO    WO 2007/048278 A1    5/2007

OTHER PUBLICATIONS

NTT DoCoMo, et al., DFT-Spread OFDM with Pulse Shaping Filter in Frequency Domain in Evolved UTRA Uplink, 3GPP TSG RAN WG1 #42 on LTE, London, UK, Aug. 29-Sep. 2, 2005, 8 pages.

*Primary Examiner* — Kenneth Lam

(57) ABSTRACT

A transmission and reception method and apparatus for reducing a PAPR in an orthogonal frequency division multiplexing (OFDM) system are provided. A transmission method includes performing constellation rotation with respect to L input data symbols, performing L-point DFT spreading and circular extension on the constellation-rotated L data symbols to be K symbols, performing frequency domain (FD) windowing processing by multiplying the K circular-extended data symbols by a circular filter coefficient, and transmitting the processed data symbols.

20 Claims, 14 Drawing Sheets

(56) References Cited

U.S. PATENT DOCUMENTS

| | | | |
|---|---|---|---|
| 8,509,324 B2 | 8/2013 | Kim et al. | |
| 8,891,637 B2 | 11/2014 | Kim et al. | |
| 2003/0026200 A1* | 2/2003 | Fu | H04L 5/026 |
| | | | 370/208 |
| 2007/0217329 A1* | 9/2007 | Abedi | H04L 27/2614 |
| | | | 370/208 |
| 2010/0165829 A1* | 7/2010 | Narasimha | H04L 27/2614 |
| | | | 370/210 |
| 2010/0239038 A1* | 9/2010 | Seyedi-Esfahani | H04L 27/2082 |
| | | | 375/261 |
| 2010/0272221 A1* | 10/2010 | Walker | H04B 1/0475 |
| | | | 375/346 |
| 2011/0182332 A1* | 7/2011 | Ericson | H04L 5/0044 |
| | | | 375/219 |

* cited by examiner

TRANSMISSION AND RECEPTION METHOD AND APPARATUS FOR REDUCING PEAK TO AVERAGE POWER RATIO IN ORTHOGONAL FREQUENCY DIVISION MULTIPLEXING SYSTEM

CROSS-REFERENCE TO RELATED APPLICATION(S) AND CLAIM OF PRIORITY

The present application is related to and claims the priority under 35 U.S.C. § 119(a) to Korean Application Serial No. 10-2015-0155391, which was filed in the Korean Intellectual Property Office on Nov. 5, 2015, the entire content of which is hereby incorporated by reference.

TECHNICAL FIELD

The present disclosure relates to a method and apparatus for transmitting and receiving data at a low peak-to-average power ratio (PAPR) in an orthogonal frequency division multiplexing (OFDM)-based multi-carrier communication system.

BACKGROUND

Recently, discussion of a new radio access technology (NR) or a $5^{th}$ generation (5G) system, which is a next generation communication system after long term evolution (LTE) (or evolved universal terrestrial radio access (E-UTRA)) and LTE-advanced (LTE-A) (or E-UTRA Evolution), is actively conducted to process exclusively increasing mobile data traffic. When compared to a legacy mobile communication system that focuses on a common voice/data communication, the 5G system is aimed at satisfying various services, such as an enhanced mobile broad-band (eMBB) service for enhancing an existing voice/data communication, an ultra-reliable and low latency communications (URLLC) service, a massive machine-type communications (mMTC) service for supporting massive machine-to-machine communication, and the like, and various requirements associated with each service.

In order to meet the wireless data traffic demand that has been increasing after the popularization of the 4G communication system, efforts to develop an improved 5G communication system or a pre-5G communication system are being made. For this reason, the 5G communication system or the pre-5G communication system is called a beyond 4G network communication system or a post LTE system. In order to achieve a high data transmission rate, the implementation of the 5G communication system in an ultrahigh frequency (mmWave) band (e.g., 60 GHz band) is being considered. To reduce the path loss of a radio wave signal in the ultrahigh frequency band and to increase the transmission distance of a radio wave signal, the 5G communication system has been discussing beamforming using an array antenna, massive MIMO, full dimensional MIMO (FD-MIMO), hybrid beamforming, and large scale antenna technologies. Further, the 5G communication system has been developing technologies, such as an evolved small cell, an advanced small cell, a cloud radio access network (RAN), an ultra-dense network, device to device communication (D2D), a wireless backhaul, a moving network, cooperative communication, coordinated multi-points (CoMP), received interference cancellation, and the like, in order to improve the system network. In addition, the 5G system has been developing hybrid FSK and QAM modulation (FQAM) and sliding window superposition coding (SWSC), which are advanced coding modulation (ACM) schemes, and filter bank multi-carrier (FBMC) and non-orthogonal multiple access (NOMA), which are advanced access technologies.

Meanwhile, the Internet has been evolved to the Internet of Things (IoT) network that exchanges and process information between distributed components such as objects and the like in a human-oriented connection network in which humans generate and consume information. An Internet of Everything (IoE) technology in which a big data processing technology through a connection with a cloud server or the like is combined with the IoT technology has emerged. In order to implement IoT, technical factors such as a sensing technology, wired/wireless communication, network infrastructure, service interface technology, and security technology are required, and thus, technologies such as a sensor network, machine to machine (M2M), machine type communication (MTC), and the like for a connection between objects are recently being researched. In an IoT environment, through the collection and analysis of data generated from connected objects, an intelligent Internet Technology (IT) service to create a new value for the human's life may be provided. IoT may be applied to fields, such as a smart home, a smart building, a smart city, a smart car or connected car, a smart grid, healthcare, smart home appliance, or high-tech medical service, through the convergence of the conventional Information Technology (IT) and various industries.

Accordingly, various attempts to apply the 5G communication system to an IoT network are being made. For example, 5G communication technologies such as a sensor network, M2M communication, and MTC are implemented by schemes such as beamforming, MIMO, and array antenna. The application of a cloud RAN as the big data processing technology may be an example of the convergence of the 5G technology and the IoT technology.

An OFDM scheme can maintain orthogonality between subcarrier symbols while overlapping subcarrier spectrums, and is a transmission technology that is capable of applying a multi-antenna transmission/reception scheme for each subcarrier in the frequency domain even in a multi-path padding wireless channel environment by using a few time overheads, such as a cyclic prefix (CP). When compared to other multi-carrier technologies, the OFDM scheme is capable of increasing frequency efficiency with low complexity, which is an advantage. The OFDM scheme is widely used as a wireless standard technology in a Wi-Fi system, an LTE system that is the $4^{th}$ generation wireless communication system, or the like, and will be utilized as a baseline waveform for a band that is less than or equal to 40 GHz in a $5^{th}$ generation wireless communication system standardization process of 3GPP. Also, the OFDM scheme is capable of grouping a plurality of subcarriers and allocating resources to a plurality of users in a single symbol with low interference, and thus, may be utilized as a multi-access scheme called orthogonal frequency division multiple access (OFDMA).

However, the OFDM scheme belongs to a multi-carrier technology, and thus, it is formed as the sum of a plurality of subcarrier symbols having different phases in the time domain and has a high PAPR or cubic metric (CM) feature. Therefore, it is difficult to effectively use a power amplifier in the OFDM scheme. Particularly, in the case of the OFDM-based uplink transmission, the efficiency of a power amplifier of a terminal may largely affect battery power consumption. Accordingly, an LTE system of $3^{rd}$ generation partnership project (3GPP) employs DFT-spread OFDM (DFT-S-OFDM) as an uplink transmission technology. The DFT-S-OFDM is a spreading transmission scheme based on discrete Fourier transform (DFT), which is well known by the name of single carrier frequency division multiple access (SC-FDMA) in an LTE system of the 3$^{rd}$ generation partnership project. In comparison with the OFDMA scheme, the DFT-S-OFDM can perform transmission with a relatively 2 to 3 dB lower PAPR and thus, may increase the efficiency of a power amplifier of a terminal.

However, in the case of the DFT-S-OFDM, the size of a spreader is smaller than the size of an inverse fast Fourier transform (IFFT) of the OFDM scheme, and an uplink resource is allocated in many cases. Also, due to multi-user channel estimation, scheduling performance, and the like, a single terminal signal is transmitted based on a subband unit of consecutive subcarriers. The LTE system is also designed to use a localized DFT-S-OFDM transmission architecture in an uplink. In this instance, a PAPR (6 dB or more) still has a drawback worse than a PAPR (2 to 4 dB) of a preamble (e.g., uplink demodulation reference signal (UL DM-RS) of an LTE system) for uplink channel estimation.

Around 2005, a "frequency domain spectral shaping" scheme that is capable of lowering a PAPR by applying a pulse such as a root raised cosine (RRC), instead of a sinc pulse that is applied to the DFT-S-OFDM, was proposed (NTT DoCoMo, NEC, and SHARP, "R1-050702: DFT-spread OFDM with Pulse Shaping Filter in Frequency Domain in Evolved UTRA Uplink," 3GPP TSG RAN WG1, meeting 42, London, UK, August 2005). In the present specification, to clearly express the "frequency domain spectral shaping" scheme from the perspective of function, it is called circular filter spreading OFDM (CFS-OFDM).

Also, although the 5$^{th}$ generation mobile communication standardization process of 3GPP has considered OFDM as an uplink/downlink common waveform, a similar spreading OFDM scheme, such as DFT-S-OFDM and CFS-OFDM, is additionally considered as an uplink waveform for coverage enhancement. A PAPR may be a great influential factor for determining an amount of back-off when a power amplifier (PA) is designed. Therefore, when the PAPR is dramatically lowered to the level of a single-tone transmission, the cost of mounting a PA may be reduced or PA efficiency may be increased, and thus, it may be helpful for a low-power operation of a terminal of which battery consumption is a big issue. Alternatively, although a low PAPR signal is transmitted at a larger transmission power in comparison with a higher PAPR signal, in the same PA, signal distortion may be low and thus, it may be helpful for cell coverage enhancement.

A PAPR is an important yield for determining a driving power of a terminal. When the PAPR is significantly high, battery is consumed quickly, and thus, user experience may be lowered. The CFS-OFDM may raise a PAPR performance by sacrificing a small amount of resource in a technology such as an Internet of things (IoT) of which a transmission rate is relatively less important, and enables a terminal existing in an edge area of a cell to perform effective uplink transmission. However, an RRC filter proposed in the existing CFS-OFDM satisfies an orthogonal condition but has difficulty in providing an optimal transmit waveform that is designed from the perspective of a PAPR.

SUMMARY

To address the above-discussed deficiencies, it is a primary object to provide a transmission and reception method and apparatus for optimizing a transmit waveform and reducing a PAPR in an OFDM system.

The present disclosure provides a transmission and reception method and apparatus for reducing a PAPR using an optimal rotated constellation in an OFDM system.

The present disclosure provides a resource allocation method and apparatus for reducing a PAPR in an OFDM system.

According to embodiments of the present disclosure, there is provided a transmission method of reducing a peak-to-average power ratio (PAPR) in an orthogonal frequency division multiplexing (OFDM) system, the method including: performing constellation rotation with respect to L input data symbols; performing L-point DFT spreading and circular extension on the constellation-rotated L data symbols to be K symbols; performing frequency domain (FD) windowing processing by multiplying the K circular-extended data symbols by a circular filter coefficient; and transmitting the processed data symbols.

According to embodiments of the present disclosure, there is provided a transmitting apparatus for reducing a PAPR in an OFDM system, the apparatus including: a transmission module for performing constellation rotation with respect to L input data symbols, executing L-point DFT spreading and circular extension on the L constellation-rotated data symbols to be K symbols, and performing frequency domain (FD) windowing processing by multiplying the K circular-extended data symbols by a circular filter coefficient.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication devices.

In the following description of embodiments of the present disclosure, a detailed description of known functions or configurations incorporated herein will be omitted when it is determined that the detailed description thereof may unnecessarily obscure the subject matter of the present disclosure.

First, a transmission and reception architecture in a DFT-S-OFDM scheme and a transmission and reception architecture in a CFS-OFDM scheme will be described to help the understanding of the present disclosure, and embodiments of the present disclosure will be described.

Figure 1:
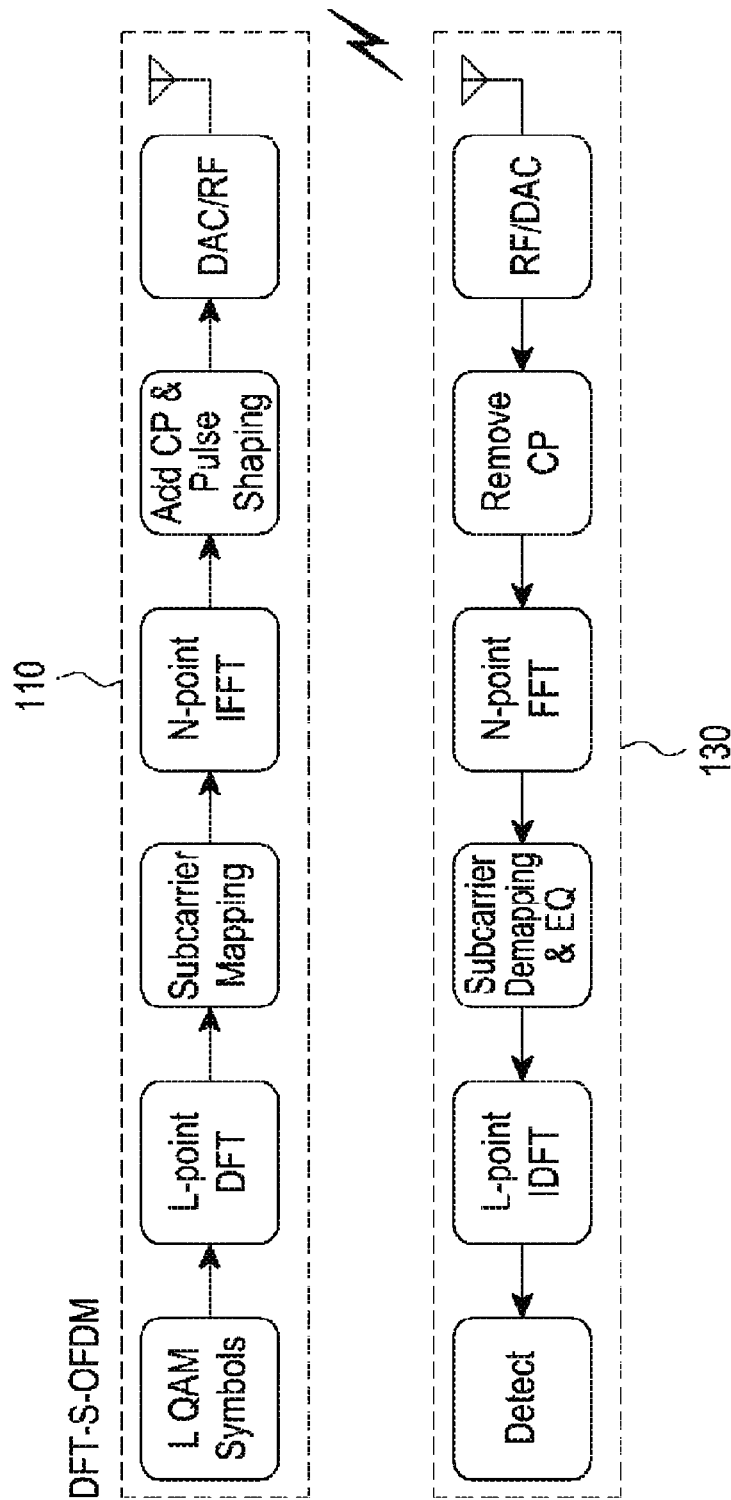
FIG. 1 illustrates a transmission and reception architecture based on a DFT-S-OFDM scheme.

FIG. 1 is a diagram illustrating a transmission and reception architecture based on a DFT-S-OFDM scheme, and illustrates an example of the transmission and reception architecture based on DFT-S-OFDM, that is, SC-FDMA that is used in an uplink of an LTE system.

Referring to FIG. 1, in the uplink of the LTE system, a terminal operates as a transmitting end 110 and a base station operates as a receiving end 130. When the base station allocates L consecutive subcarrier resources to the terminal, the transmitting end 110 inputs L QAM data symbols into L-point DFT for spreading, maps the same to IFFT index positions corresponding to the allocated consecutive subcarriers, and fills the remaining area with 0, thereby performing N-point IFFT. Subsequently, an operation of applying a CP, an operation of applying pulse shaping as occasion needs, or the like are the same as the existing OFDM transmission architecture. The receiving end 130 operates in reverse order of operations of the transmitting end 110.

Figure 2:
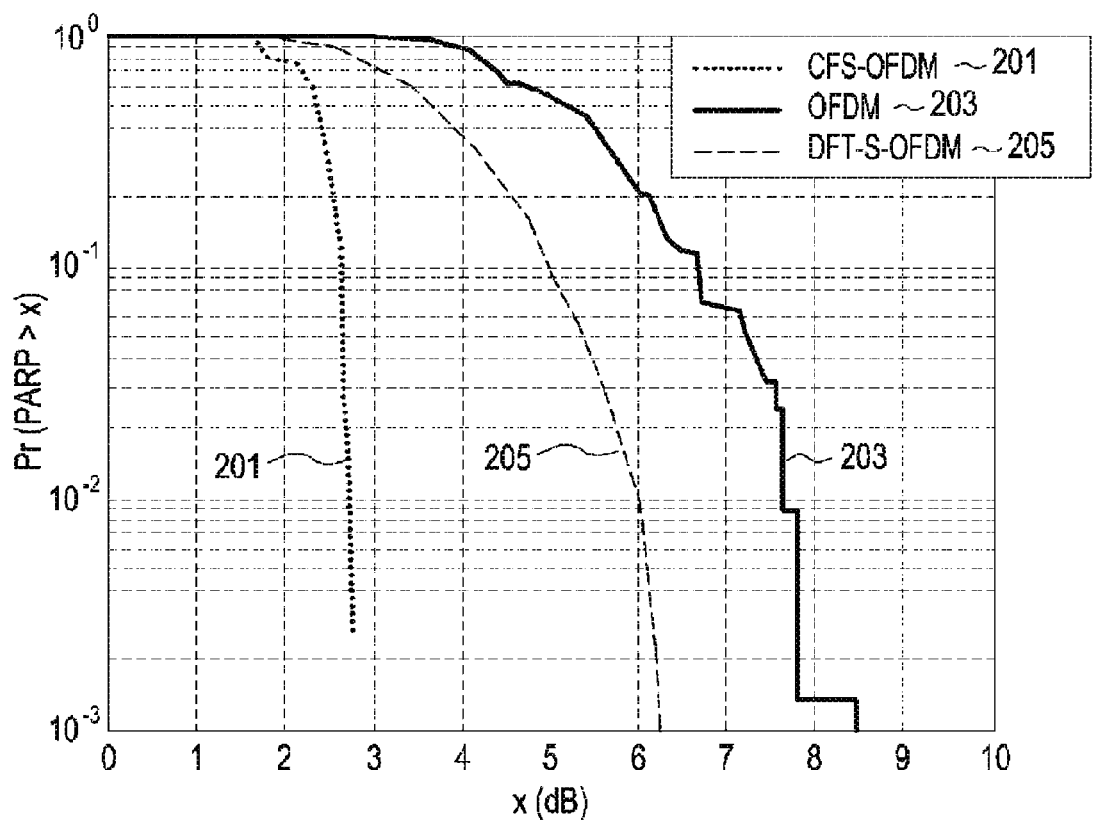
FIG. 2 illustrates a PAPR feature when CFS-OFDM, normal OFDM, and DFT-S-OFDM are applied respectively in an uplink of an OFDM system.

FIG. 2 is a diagram illustrating a PAPR feature when CFS-OFDM, normal OFDM, and DFT-S-OFDM are applied respectively in the uplink of an OFDM system. The example of FIG. 2 illustrates PAPR complementary cumulative distribution functions (CCDF) of CFS-OFDM, normal OFDM, and DFT-S-OFDM, respectively, when L=7, which means that seven QPSK data symbols are transmitted in seven subcarriers in the uplink of the OFDM system that uses 128-IFFT (that is, N=128). The reference numeral 201 indicates a CCDF of the CFS-OFDM, the reference numeral 203 indicates a CCDF of the normal OFDM, and the reference numeral 205 indicates a CCDF of the DFT-S-OFDM.

A PAPR of a channel estimation preamble (a known signal without randomness), such as an uplink DM-RS in the LTE system, is designed to be in a 2 to 4 dB level. A PAPR of a DFT-S-OFDM symbol that is to transmit a data symbol is greater than or equal to 6 dB as shown in FIG. 2, and thus, back-off needs to be increased by adjusting an operation point of a PA to the PAPR of the DFT-S-OFDM symbol of a data transmission side. As a matter of course, the PAPR feature of the DFT-S-OFDM is better than the PAPR feature of pure OFDM, but may not reach the level of the PAPR feature of an RS. Also, the OFDM system for CIoT needs to support a low data transmission rate to use as little energy as possible. Therefore, in the case of the uplink, resource allocation can be performed based on a single subcarrier unit. Also, in the case of a CIoT terminal that requires a relatively higher data transmission rate, it is possible that a modulation and coding scheme (MCS) level can be raised, but a transmission band needs to be increased by performing per-tone channel bonding. The case also corresponds to a multi-tone transmission, and thus, can cause a drawback of a high PAPR, like the DFT-S-OFDM of FIG. 2. Therefore, to increase the PA efficiency of a terminal in the OFDM system, there is a desire for an OFDM uplink multi-access scheme that has a PAPR feature better than the existing DFT-S-OFDM. Particularly, in the case of the CIoT terminal, a feature of a low PAPR is strongly required to use a battery for years.

Figure 3:
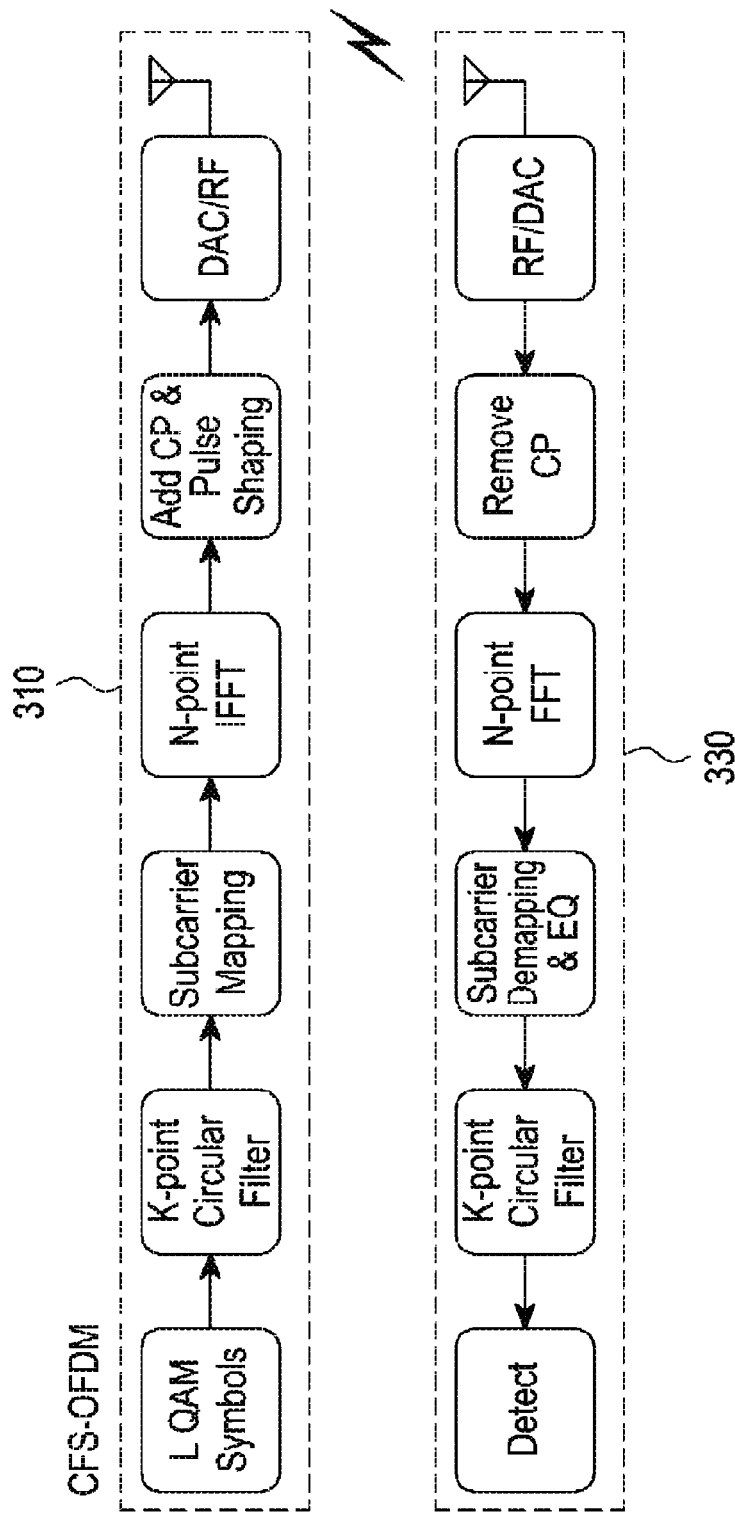
FIG. 3 illustrates a transmission and reception architecture of CFS-OFDM, which is an extended version of DFS-S-OFDM.

FIG. 3 is a diagram illustrating a transmission and reception architecture of CFS-OFDM, which is an extended version of DFS-S-OFDM.

Unlike the DFT-S-OFDM transmitting end 110 that uses an L-point DFT to transmit L symbols in FIG. 1, a CFS-OFDM transmitting end 310 of FIG. 3 uses a K-point circular filter as a spreader to transmit L symbols. Here, K denotes a CFS-OFDM spreading factor, and is a natural number greater than or equal to L (that is, K≥L). The circular filter spreader used in the CFS-OFDM is defined by Equation 1 as provided below:

$$Sd = [s_{mn}]_{K \times L} \begin{bmatrix} d_0 \\ d_1 \\ \vdots \\ d_{L-1} \end{bmatrix}, \quad \text{[Equation 1]}$$

$$s_{mn} = p_m e^{-j\frac{2\pi}{L}mn},$$

$$(m = 0, 1, \ldots, K-1, n = 0, 1, \ldots, L-1)$$

In Equation 1, $d_0, d_1, \ldots$, and $d_{L-1}$ denote L complex data symbols to be transmitted in a single OFDM symbol, and S denotes a K×L matrix that performs circular filter spreading. $p_m$ denotes a complex number or a real number that does not depend on a column index n, which is referred to as a circular filter coefficient. A transmission power per data symbol can be normalized by limiting the circular filter coefficient to $\Sigma_{m=0}^{K-1}|p_m|^2=1$. The circular filter coefficient can be referred to as a filter value.

An L-point DFT spreader used in the DFT-S-OFDM can be defined by Equation 2 as provided below:

$$Wd = [w_{mn}]_{L \times L} \begin{bmatrix} d_0 \\ d_1 \\ \vdots \\ d_{L-1} \end{bmatrix}$$ [Equation 2]

$$w_{mn} = \frac{1}{\sqrt{L}} e^{-j\frac{2\pi}{L}mn}, (m, n = 0, 1, \ldots, L-1)$$

In Equation 2, Wd denotes a DFT matrix for spreading. Through the comparison between Equation 1 and Equation 2, it is determined that the DFT-S-OFDM is a special case of the CFS-OFDM in which K=L and $p_m$ is a constant value of $$\frac{1}{\sqrt{L}}.$$

Figure 4:
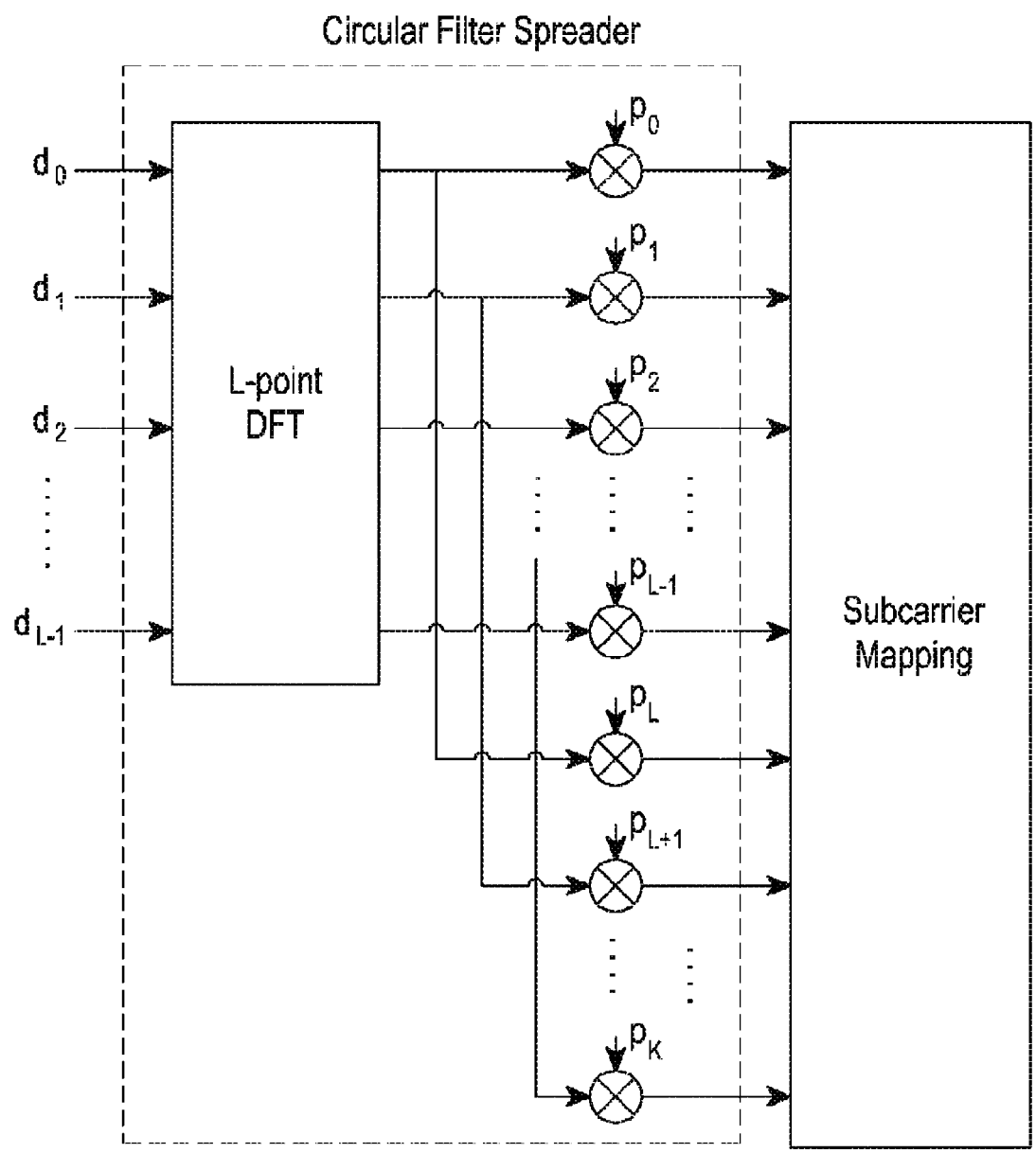
FIG. 4 illustrates an example of a structure of a circular filter spreader in a CFS-OFDM transmitting end.

Also, like the example of the structure of a circular filter spreader of a transmitting end of FIG. 4, the CFS-OFDM reuses a DFT spreader of the DFT-S-OFDM, and can be embodied as an extended structure by adding the multiplication of a circular filter coefficient ($p_0, \ldots, p_k$). The CFS-OFDM that is embodied in which K>L, can be converted into the DFT-S-OFDM by changing the setting of a circular filter coefficient to $$p_m = \frac{1}{\sqrt{L}},$$

(m=0, 1, . . . , L−1), $p_m$=0 (m=L, L+1, . . . , K).

A CFS-OFDM receiving end 330 FIG. 3 operates in reverse order of the operations of the CFS-OFDM transmitting end 310.

Figure 5:
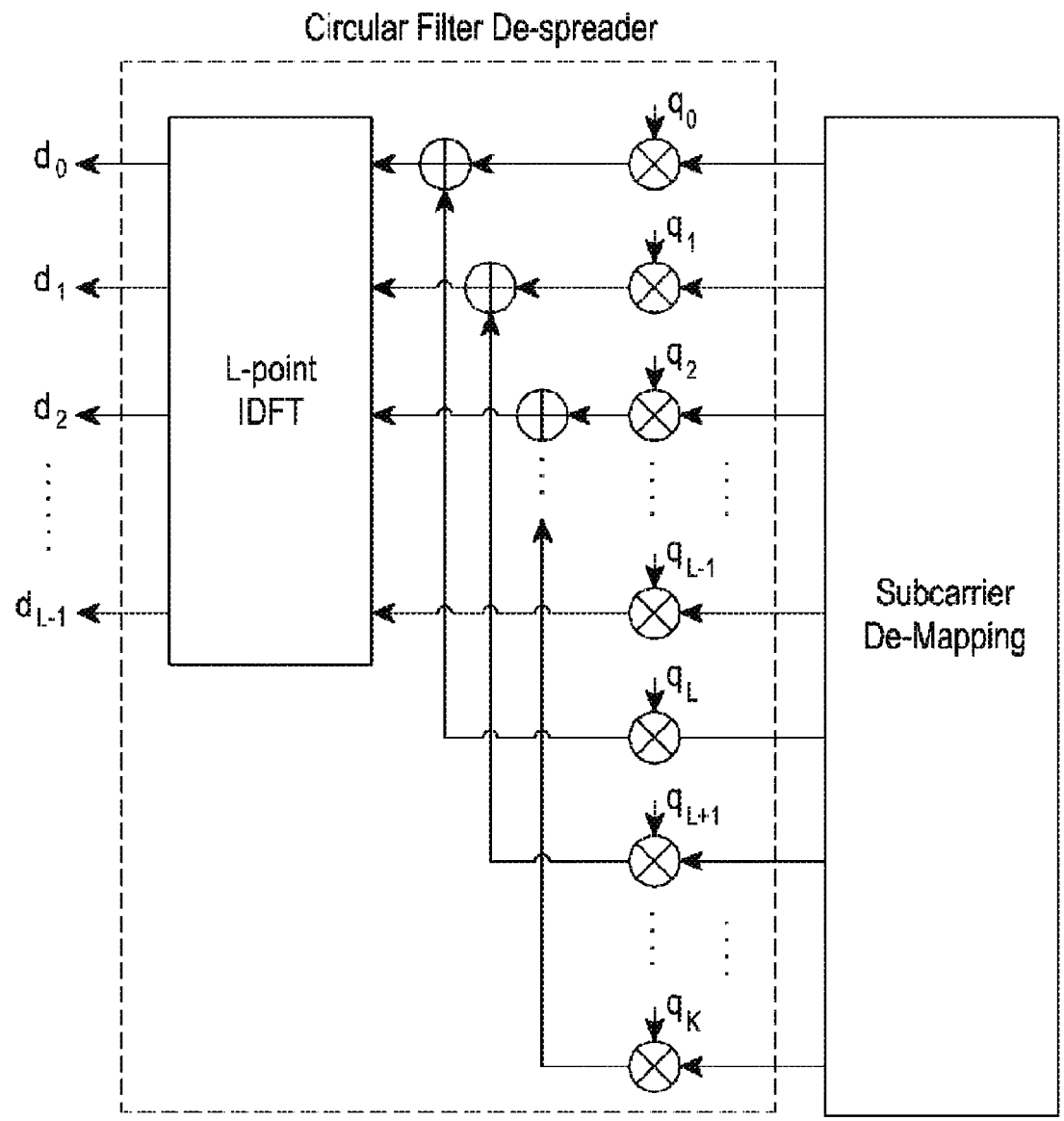
FIG. 5 illustrates an example of a structure of a circular filter de-spreader in a CFS-OFDM receiving end.
Figure 6:
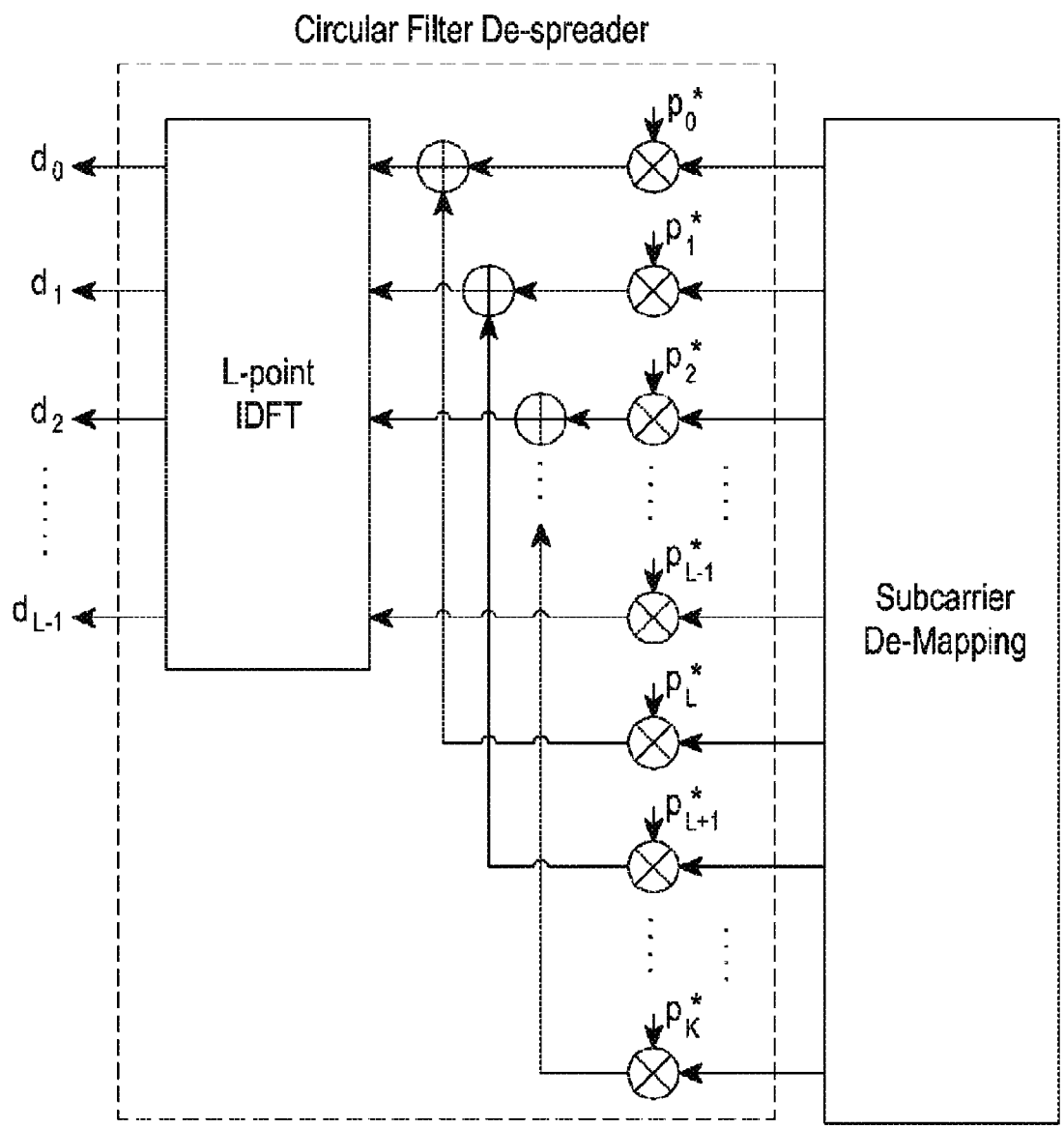
FIG. 6 illustrates another example of a structure of a circular filter de-spreader in a CFS-OFDM receiving end.

FIG. 5 is a diagram illustrating an example of a configuration of a circular filter de-spreader, that is, K-point circular filter of the CFS-OFDM receiving end 330. The CFS-OFDM receiving end 330 outputs final complex symbol data $d_0$, $d_1, \ldots,$ and $d_{L-1}$, through the circular filter de-spreader, and subsequently, performs a demodulation process. In the CFS-OFDM receiving end 330, the conversion from CFS-OFDM into DFT-S-OFDM can be also performed by setting a circular filter coefficient, like the CFS-OFDM transmitting end 310. Also, the circular filter coefficient $q_m$ (m=0, 1, . . . , K) in the CFS-OFDM receiving end 330 can be set to be Hermitian matrix (that is, a complex conjugate matrix) of the circular filter matrix in the CFS-OFDM transmitting end 310 (i.e., $q_m=p_m^*$), as shown in the example of FIG. 6, but the circular filter coefficient can be changed to another circular filter coefficient $q_m$ based on a reception algorithm.

The CFS-OFDM transmission and reception architecture of FIG. 3 can be configured in a form that substitutes a spreader/de-spreader for the existing DFT spreader/de-spreader, and other elements in the CFS-OFDM transmission and reception architecture can reuse the elements of the existing DFT-S-OFDM architecture.

To reduce a PAPR in the OFDM system, a π/2-binary phase shift keying (BPSK) or π/4-quadrature phase shift keying (QPSK) modulation scheme, or a scheme of combining a pulse of the CFS-OFDM with a different pulse such as Gaussian, Prolate, Kaiser, or the like, instead of RRC, and transmitting the same, can be considered. However, a technology that derives an optimal pulse pattern by defining a relationship between constellation rotation and pulse shaping of the CFS-OFDM, or a technology that takes into consideration the orthogonality of a frequency domain pulse sample has not yet been proposed.

To increase the PA efficiency of a terminal in the OFDM system, a PAPR of a data symbol having randomness needs to be lowered to a PAPR level of a low PAPR preamble (e.g., an LTE UL DM-RS) for uplink channel estimation. Therefore, embodiments of the present disclosure propose a scheme of dramatically decreasing a PAPR of an OFDM transmission symbol that transmits transmission data to be lower than that of the DFT-S-OFDM, without being dependent upon the corresponding transmission data having randomness, through a method of optimizing the constellation rotation and pulse shaping of the CFS-OFDM.

To this end, proposed in the embodiments of the present disclosure are a technology for designing an optimal transmit waveform using an object function that is directly associated with a PAPR by reflecting a constellation, and optimized parameter values therefor. An embodiment of the present disclosure to be described herein proposes a modified CFS-OFDM scheme (hereinafter, referred to as a rotated constellation CFS-OFDM scheme) that further decreases a PAPR by modifying the phase of a modulation symbol in the existing CFS-OFDM, an optimal scheme for designing a transmit waveform in the rotated constellation CFS-OFDM scheme, and an optimal scheme for constellation rotation. Optimal parameters provided through the optimal schemes can be locally optimum values in constellation rotation, and can have features of increasing a PAPR performance in proportion to the amount of resource that is additionally used in comparison to the existing CF S-OFDM.

First, variables used in the equations to be described for the descriptions of the present disclosure are defined as listed in Table 1 as below. Variables that are not defined in Table 1 provided below can comply with the definition in each equation.

TABLE 1

| Variables | Descriptions |
| --- | --- |
| L | The number of data symbols to be transmitted through a single OFDM symbol |
| K | CFS-OFDM spreading factor |
| N | OFDM IDFT size |
| $W_L$ | L-point DFT matrix |

TABLE 1-continued

| Variables | Descriptions |
|---|---|
| $W_N^{\mathcal{H}}$ | N-point IDFT matrix |
| $\underline{d}[n]$ | L-by-1 data symbol vector |
| S | K-by-L circular filter matrix having $(S)_{i,j}$ as an element $$(S)_{i,j} = p_i e^{-j\frac{2\pi(i-1)(j-1)}{L}}$$ Here, i denotes a frequency index, j denotes a symbol index, and $p_i$ denotes an $i^{th}$ component of a circular filter vector |
| $\underline{x}[n]$ | Transmit-vector |
| $A \triangleq S \begin{bmatrix} W_L \\ 0_{N-L \text{ by } L} \end{bmatrix}$ | Overall pulse shaping matrix having $$(A)_{i,j} = \frac{1}{\sqrt{N}} \sum_{k=1}^{K} p_k e^{j2\pi(k-1)\left(\frac{(i-1)}{N} - \frac{(j-1)}{L}\right)}$$ |
| $\underline{p} \triangleq \begin{bmatrix} p_1 \\ p_2 \\ \vdots \\ p_K \end{bmatrix}$ | Circular filter vector |
| $\underline{S}_l$ | Transmit-waveform vector of $1^{st}$ symbol |

When designing a transmit waveform of CFS-OFDM, embodiments of the present disclosure derive a circular filter vector $\underline{p}$ indicating an optimal circular filter that decreases a PAPR and maintains an orthogonality between data. The circular filter vector $\underline{p}$ that minimizes a PAPR is expressed by Equation 3 as provided below.

$$\underset{\underline{p}}{\text{minimize }} PPAR \qquad [\text{Equation 3}]$$

subject to satisfy orthogonality condition $$\equiv \underset{\underline{p}}{\text{minimize }} Pr\left(\frac{\underset{1 \leq i \leq N}{\max} |x_i|^2}{\frac{1}{N}\mathbb{E}[\|\underline{x}[n]\|^2]} > y\right)$$

subject to $S^{\mathcal{H}}S = I$

In Equation 3, "Pr( )" indicates a probability that a PAPR is higher than a predetermined threshold value (y) for reducing a PAPR.

To reduce a PAPR, a necessary and sufficient condition of a circular filter that maintains the orthogonality between data, which is given as a constraint condition, is defined by Equation 4 as provided below.

$$\sum_{i'=0}^{\lfloor \frac{N}{L} \rfloor} |p_{Li'+i}|^2 = const, \forall i \in \{1, 2, \ldots, L\}. \qquad [\text{Equation 4}]$$

Also, in embodiments of the present disclosure, an example of a condition associated with a K–L value can be listed in Table 2 as provided below. $p_1, p_2, \ldots,$ and $p_K$ in Table 2 are components of a circular filter vector indicating a circular filter.

TABLE 2

| K-L | # of free variables | Free variables | conditions |
|---|---|---|---|
| 1 | 0 | | $|p_1|^3 = |p_K|^3 = \frac{const}{2}$ |
| 2 | 1 | $(|p_1|^2)$ | $|p_2|^3 = |p_{K-2}|^3 = const - |p_2|^2,$ $|p_K|^2|p_1|^2$ |
| 3 | 1 | $(|p_1|^2)$ | $|p_3|^2 = |p_{K-2}|^2 = const - |p_1|^2,$ $|p_K|^2 = |p_1|^3$ $|p_2|^2 = |p_{K-1}|^2 = \frac{const}{2}$ |
| 4 | 2 | $(|p_1|^2, |p_2|^2)$ | $|p_3|^2 = |p_{K-2}|^2 = const - |p_2|^2,$ $|p_4|^2 = |p_{K-3}|^2 = const - |p_1|^2,$ $|p_{K-1}|^2 = |p_2|^2 \cdot |p_K|^2 = |p_1|^2$ |
| 5 | 2 | $(|p_1|^2, |p_2|^2)$ | $|p_4|^2 = |p_{K-3}|^2 = const - |p_2|^2,$ $|p_3|^3 = |p_{K-4}|^2 = const - |p_3|^2,$ $|p_{K-1}|^2 = |p_2|^2, |p_K|^2 = |p_1|^2$ $|p_K|^2 = |p_{K-2}|^2 = \frac{const}{2}$ |

Through Equation 4, an orthogonality condition of a circular filter with respect to every K and L can be calculated. Although not mentioned in embodiments of the present disclosure, the optimization for reducing a PAPR considers filters that satisfy orthogonality.

Figure 7:
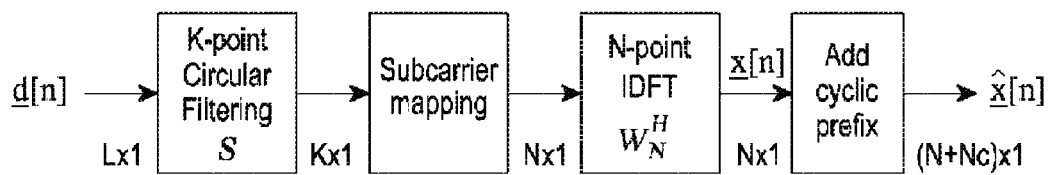
FIG. 7 illustrates a structure of a CFS-OFDM transmitting end.

FIG. 7 illustrates the structure of a CFS-OFDM transmitting end, and Equation 5 provided below expresses the transmitting end of FIG. 7 as a formula. The meaning of each variable illustrated in FIG. 7 is the same as the definition of Table 1, and Nc is the number of samples that is added as a CP is added. Also, the operations (subcarrier mapping, IDFT, CP adding) performed after circular filtering in FIG.

7 are the same as the publicly known operations performed in the OFDM system, and thus, the detailed descriptions thereof will be omitted.

$$x[n] = W_N^H \begin{bmatrix} S \\ 0_{N-K \text{ by } L} \end{bmatrix} d[n] \quad \text{[Equation 5]}$$

$$= A d[n]$$

$$= \sum_{l=1}^{L} d_l[n] s_l$$

where $$s_l \triangleq W_N^H (\tilde{w}_L^{(l)} \odot p)$$

Equation 5 expresses a transmit vector $\underline{x}[n]$ of a final transmit signal using a data symbol $\underline{d}[n]$ vector and an overall pulse shaping matrix A. In Equation 5, $O_{N-K}$ by L denotes "0" matrix in a size of N-K by L, $\tilde{w}_L^{(l)}$ denotes an element of a first column of an L-by-1 DFT matrix, and $\odot$ denotes the operator of element wise multiplication.

In this instance, a PAPR can be expressed by Equation 6 as provided below, and the PAPR can be simply expressed as the last line of Equation 6 based on the similarity in structures between CFS-OFDM and SC-FDMA.

$$Pr\left(\frac{\max_{1 \leq i \leq N} |x_i|^2}{\frac{1}{N} \mathbb{E}[\|x[n]\|^2]} > y\right) = 1 - Pr\left(\frac{\max_{1 \leq i \leq N} |x_i|^2}{\frac{1}{N} \mathbb{E}[\|x[n]\|^2]} \leq y\right) \quad \text{[Equation 6]}$$

$$\simeq 1 - Pr\left(\frac{\max_{1 \leq i \leq N/L} |x_i|^2}{\frac{1}{N} \mathbb{E}[\|x[n]\|^2]} \leq y\right)^L$$

Therefore, a PAPR is determined based on a peak value of the components of a transmit vector $\underline{x}[n]$, and thus, the PAPR can be decreased through the optimization like Equation 7 as provided below.

$$\underset{\underline{p}}{\text{minimize}} \max_{i \in \{1,2,\ldots,N\}} |x_i| \quad \text{[Equation 7]}$$

In Equation 7, the optimization is about a condition that optimizes an exactly asymptotic PAPR, that is, a near 100% percentile PAPR. The optimization can be expressed by Equation 8 using an overall pulse shaping matrix A and data $d_j$.

$$\underset{\underline{p}}{\text{minimize}} \max_{i \in \{1,2,\ldots,N\}} \left| \sum_{j=1}^{L} (A)_{i,j}(\underline{p}) d_j \right| \quad \text{[Equation 8]}$$

In Equation 8, $(A)_{i,j}(\underline{p})$ denotes an (i,j) element of the overall pulse shaping matrix A to which a circular filter $\underline{p}$ is applied, and $d_j$ is a $j^{th}$ data symbol in a data symbol vector.

An optimal transmit waveform can vary based on a modulation scheme used in the OFDM system, that is, a constellation through which a data symbol is transmitted. On the assumption that a uniform PSK is used, the optimization can be expressed by Equation 9 as provided below.

$$\underset{\underline{p}}{\text{minimize}} \max_{i \in \{1,2,\ldots,N\}} \left| \sum_{j=1}^{L} (A)_{i,j}(\underline{p}) d_j \right| = \quad \text{[Equation 9]}$$

$$\underset{\underline{p}}{\text{minimize}} \max_{i \in \{1,2,\ldots,N\}} \sum_{j=1}^{L} |(A)_{i,j}(\underline{p})| \simeq$$

$$\underset{\underline{p}}{\text{minimize}} \max_{i \in \{1,2,\ldots,\lfloor \frac{N}{L} \rfloor\}} \sum_{j=1}^{L} |(A)_{i,j}(\underline{p})|$$

In the case of the uniform PSK, within a unit circle of a complex plain, all phases are used for a data symbol transmission, and thus, a data symbol vector in which all phases of $(A)_{i,j}(\underline{p})$ are aligned can exist. Therefore, the peak value can be the sum of all absolute values of $(A)_{i,j}(\underline{p})$ when the all phases are aligned. A circular filter that minimizes the peak value can be an optimal circular filter. Also, based on the similarity in structures between CFS-OFDM and SC-FDMA, the optimization can be simplified from the entire length N to $\lfloor N/L \rfloor$.

According to embodiments of the present disclosure, when BPSK is used as a constellation, the optimization (hereinafter, a PAPR optimization condition) can be expressed by Equation 10 as provided below.

$$\underset{\underline{p}}{\text{minimize}} \max_{i \in \{1,2,\ldots,N\}} \left| \sum_{j=1}^{L} (A)_{i,j}(\underline{p}) d_j \right| = \quad \text{[Equation 10]}$$

$$\underset{\underline{p}}{\text{minimize}} \max_{i \in \{1,2,\ldots,N\}} \left( \sum_{j=1}^{L} |(A)_{i,j}(\underline{p})|^2 + \right.$$

$$2 \sum_{l1=1}^{L-1} \sum_{l2=l1+1}^{L} |(A)_{i,l1}(\underline{p})| \cdot |(A)_{i,l2}(\underline{p})| \cdot$$

$$\left. \left| \cos\left(\pi \frac{(l1-l2)(K-1)}{L}\right) \right| \right) \simeq \underset{\underline{p}}{\text{minimize}}$$

$$\max_{i \in \{1,2,\ldots,\lfloor \frac{N}{L} \rfloor\}} \left( \sum_{j=1}^{L} |(A)_{i,j}(\underline{p})|^2 + 2 \sum_{l1=1}^{L-1} \sum_{l2=l1+1}^{L} |(A)_{i,l1}(\underline{p})| \cdot \right.$$

$$\left. |(A)_{i,l2}(\underline{p})| \cdot \left| \cos\left(\pi \frac{(l1-l2)(K-1)}{L}\right) \right| \right)$$

In Equation 10, $l_1$ and $l_2$ are symbol indices of data symbols in BPSK, and a phase difference between $(A)_{i,l1}(\underline{p})$ and $(A)_{i,l2}(\underline{p})$ is always $$\pi \frac{(l1-l2)(K-1)}{L}.$$

Therefore, the maximum value of $$\left| \sum_{j=1}^{L} (A)_{i,j}(\underline{p}) d_j \right|$$

can be calculated to be $$\left(\sum_{j=1}^{L}|(A)_{i,j}(\underline{p})|^2 + 2\sum_{l1=1}^{L-1}\sum_{l2=l1+1}^{L}|(A)_{i,l1}(\underline{p})|\cdot|(A)_{i,l2}(\underline{p})|\cdot|\cos((l1-l2)\theta)|\right)$$

through the combination with BPSK data symbols of +1 and −1. The PAPR optimization condition can be an optimal solution to minimize a near 100% percentile PAPR, in the case of the CFS-OFDM that uses a BPSK constellation. In the same manner, the PAPR optimization condition can be simplified to $$\lceil \frac{N}{L} \rceil,$$

as opposed to the entire length N of IDFT.

According to embodiments of the present disclosure, when QPSK is used as a constellation, the PAPR optimization condition can be expressed by Equation 11 as provided below.

[Equation 11]
$$\underset{\underline{p}}{\text{minimize}} \underset{i \in (1,2,\ldots,N)}{\max} \left|\sum_{j=1}^{L}(A)_{i,j}(\underline{p})d_j\right| =$$

$$\underset{\underline{p}}{\text{minimize}} \underset{i \in (1,2,\ldots,N)}{\max} \left(\sum_{j=1}^{L}|(A)_{i,j}(\underline{p})|^2 + 2\sum_{l1=1}^{L-1}\sum_{l2=l1+1}^{L}|(A)_{i,l1}(\underline{p})|\cdot|(A)_{i,l2}(\underline{p})|\cdot c(l1,l2)\right) \simeq$$

$$\underset{\underline{p}}{\text{minimize}} \underset{i \in (1,2,\ldots,\lceil\frac{N}{L}\rceil)}{\max} \left(\sum_{j=1}^{L}|(A)_{i,j}(\underline{p})|^2 + 2\sum_{l1=1}^{L-1}\sum_{l2=l1+1}^{L}|(A)_{i,l1}(\underline{p})|\cdot|(A)_{i,l2}(\underline{p})|\cdot c(l1,l2)\right)$$

$$c(l1,l2) \triangleq \underset{\theta \in \{c,\frac{N}{L}\}}{\max} \left|\cos\left(\pi\frac{(l1-l2)(K-1)}{L}+\theta\right)\right|$$

In Equation 11, a phase difference between $(A)_{i,l1}(\underline{p})$ and $(A)_{i,l2}(\underline{p})$ is always $$\pi\frac{(l1-l2)(K-1)}{L},$$

and thus, the maximum value of $$\left|\sum_{j=1}^{L}(A)_{i,j}(\underline{p})d_j\right|$$

can be calculated as shown in Equation 12 and Equation 13 by combining a QPSK data symbol and $$e^{j0}, e^{j\frac{\pi}{2}}e^{j\pi}, e^{j\frac{3\pi}{2}}e^{j0}, e^{j\frac{\pi}{2}}e^{j\pi}, e^{j\frac{3\pi}{2}}$$

[Equation 12]
$$\left(\sum_{j=1}^{L}|(A)_{i,j}(\underline{p})|^2 + 2\sum_{l1=1}^{L-1}\sum_{l2=l1+1}^{L}|(A)_{i,l1}(\underline{p})|\cdot|(A)_{i,l2}(\underline{p})|\cdot c(l1,l2)\right)$$

[Equation 13]
$$c(l1,l2) \triangleq \underset{\theta \in \{0,\frac{\pi}{2}\}}{\max} \left|\cos\left(\pi\frac{(l1-l2)(K-1)}{L}+\theta\right)\right|$$

The PAPR optimization condition can be an optimal solution to minimize a near 100% percentile PAPR, in the case of the CFS-OFDM that uses a QPSK constellation. In the same manner, the PAPR optimization condition can be simplified to $$\lceil \frac{N}{L} \rceil,$$

as opposed to the entire length N of IDFT.

Also, a person skilled in the art can readily derive an optimization condition for obtaining an optimal circular filter according to various constellations (e.g., 16-QAM, 64-QAM, or the like) by extending the embodiments of the present disclosure.

Figure 8:
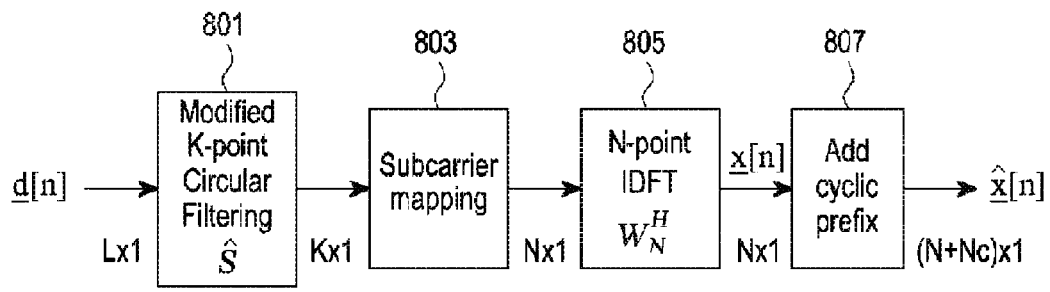
FIG. 8 illustrates a structure of a transmitting end of a rotated constellation CFS-OFDM according to embodiments of the present disclosure.

FIG. 8 is a diagram illustrating a structure of a transmitting end of a rotated constellation CFS-OFDM according to embodiments of the present disclosure. The transmitting end of the rotated constellation CFS-OFDM of FIG. 8 includes a circular filter 801, a subcarrier mapper 803, an IDFT unit 805, and a CP adder 807. The subcarrier mapper 803, the IDFT unit 805, and the CP adder 807 can use publicly known configurations.

The circular filter 801 in FIG. 8 performs constellation rotation with respect to L input data symbols, executes L-point DFT spreading and circular extension on the L constellation-rotated data symbols to be K symbols, and performs frequency domain (FD) windowing by multiplying the K circular extended data symbols with a circular filter coefficient. Here, K is a natural number that is greater than or equal to L. As another example, the circular filter 801 can be embodied as a spreader that performs a spreading operation using a K-by-L matrix, without performing L-point DFT spreading and FD windowing like the LTE system. In this instance, the L constellation-rotated data symbols can be spread by the K-by-L matrix and can be output as K data symbols. Here, K is a natural number that is greater than or equal to L. As another example, the circular filter 801 can be embodied as a spreader of a K-by-L matrix so as to perform a spreading operation including the constellation rotation with respect to L input data symbols. When the circular filter 801 is embodied as a single spreader Equation 14 can be given as provided below. In this instance, the effect of the constellation rotation can be provided through a shift index.

In FIG. 8, the subcarrier mapper 803 maps the K data symbols to IDFT index positions corresponding to N subcarriers, the IDFT unit 805 performs IDFT that transforms the mapped data symbols from the frequency domain to the time domain, and the CP adder 807 adds CPs to the IDFT-processed data symbols and outputs the same as OFDM symbols.

The constellation rotation performed in the circular filter 801 can be performed using a shift index (shiftindex) as shown in Equation 14. The constellation rotation can have the effect of rotating the constellation of data symbols. Equation 14 expresses an element $(S)_{i,j}$ in a K-by-L circular filter matrix.

$$(\hat{S})_{i,j} = p_i e^{-j\frac{2\pi(i-1-shiftindex)(j-1)}{L}} \quad \begin{array}{l} i: \text{frequency index} \\ j: \text{symbol index} \end{array} \quad [\text{Equation 14}]$$

Figure 9:
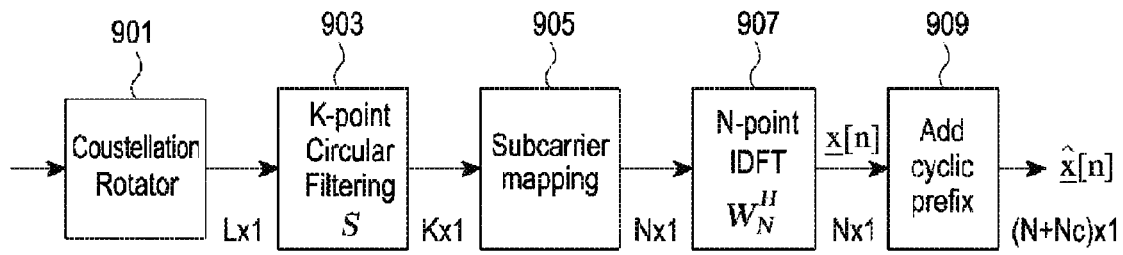
FIG. 9 illustrates a structure of a transmitting end of a rotated constellation CFS-OFDM according to other embodiments of the present disclosure.

FIG. 9 is a diagram illustrating a structure of a transmitting end of a rotated constellation CFS-OFDM according to other embodiments of the present disclosure. The transmitting end of the rotated constellation CFS-OFDM of FIG. 9 includes a constellation rotator 901, a circular filter 903, a subcarrier mapper 905, an IDFT unit 907, and a CP adder 909. The subcarrier mapper 903, the IDFT unit 907, and the CP adder 909 can use publicly known configurations, like the embodiment of FIG. 8.

The embodiment of FIG. 8 configures the circular filter 801 to further perform a constellation rotation function. The embodiment of FIG. 9 configures the constellation rotator 901 that performs constellation rotation as a separate block that is distinguished from the circular filter 903. Although the transmitting ends in the embodiments of FIGS. 8 and 9 are examples of different configurations of a transmitting end, they are different merely in view of embodiment and an output of the transmitting end according to the two embodiments are the same. The circular filter 903 performs L-point DFT spreading and circular extension on L constellation-rotated data symbols to be K symbols, and performs FD windowing that multiplies the K circular extended data symbols with a circular filter coefficient.

A receiving end that corresponds to the transmitting end of FIG. 8 and FIG. 9 operates in reverse order of the operations of the transmitting end, and thus, detailed descriptions thereof will be omitted.

The optimization of a transmit waveform of CFS-OFDM, which has been described in FIG. 7, designs a circular filter $\underline{p}$ with respect to a given constellation. However, the rotated-constellation CFS-FDM according to the embodiments of the present disclosure considers the optimization of a circular filter $\underline{p}$ (that is, a filter value) and a constellation rotation value $\theta$ (that is, a phase value) with respect to a given constellation. In a case in which BPSK is used as a constellation and rotated-constellation CFS-OFDM is used, the optimization of a transmit waveform can be expressed by Equation 15.

$$\underset{\underline{p},\theta}{\text{minimize}} \underset{i \in (1,2,\ldots,N)}{\max} \left| \sum_{j=1}^{L} (A)_{i,j}(\underline{p}) d_j \right| = \quad [\text{Equation 15}]$$

$$\underset{\underline{p},\theta}{\text{minimize}} \underset{i \in (1,2,\ldots,N)}{\max} \left( \sum_{j=1}^{L} |(A)_{i,j}(\underline{p})|^2 + 2 \sum_{l1=1}^{L-1} \sum_{l2=l1+1}^{L} |(A)_{i,l1}(\underline{p})| \cdot |(A)_{i,l2}(\underline{p})| \cdot \left| \cos\left((l1-l2)\left(\frac{\pi(K-1)}{L} + \theta\right)\right) \right| \right) \simeq$$

$$\underset{\underline{p},\theta}{\text{minimize}} \underset{i \in (1,2,\ldots,\lceil \frac{N}{L} \rceil)}{\max} \left( \sum_{j=1}^{L} |(A)_{i,j}(\underline{p})|^2 + \right.$$

$$\left. 2 \sum_{l1=1}^{L-1} \sum_{l2=l1+1}^{L} |(A)_{i,l1}(\underline{p})| \cdot |(A)_{i,l2}(\underline{p})| \cdot \left| \cos\left((l1-l2)\left(\frac{\pi(K-1)}{L} + \theta\right)\right) \right| \right)$$

Equation 15 is almost similar to Equation 3, and considers the optimization of $\underline{p}$ and $\theta$ together. Double optimization that optimizes $\underline{p}$ and $\theta$ together can be performed to detect optimal $\underline{p}$ and $\theta$ values through repetition. When BPSK is used as a constellation, an operation of detecting the optimal $\underline{p}$ and $\theta$ values can be performed as given in Equation 16 and FIG. 10.

$$\underline{p}_0 = \underset{\underline{p}}{\text{argmin}} \underset{i \in (1,2,\ldots,N)}{\max} \left( \sum_{j=1}^{L} |(A)_{i,j}(\underline{p})|^2 + \right. \quad [\text{Equation 16}]$$

$$\left. 2 \sum_{l1=1}^{L-1} \sum_{l2=l1+1}^{L} |(A)_{i,l1}(\underline{p})| \cdot |(A)_{i,l2}(\underline{p})| \cdot \left| \cos\left((l1-l2)\left(\frac{\pi(K-1)}{L} + \theta_0\right)\right) \right| \right)$$

$$\theta_1 = \underset{\theta}{\text{argmin}} \underset{i \in (1,2,\ldots,N)}{\max} \left( \sum_{j=1}^{L} |(A)_{i,j}(\underline{p}_0)|^2 + \right.$$

$$\left. 2 \sum_{l1=1}^{L-1} \sum_{l2=l1+1}^{L} |(A)_{i,l1}(\underline{p}_0)| \cdot |(A)_{i,l2}(\underline{p}_0)| \cdot \left| \cos\left((l1-l2)\left(\frac{\pi(K-1)}{L} + \theta\right)\right) \right| \right)$$

$$\underline{p}_1 = \underset{\underline{p}}{\text{argmin}} \underset{i \in (1,2,\ldots,N)}{\max} \left( \sum_{j=1}^{L} |(A)_{i,j}(\underline{p})|^2 + 2 \sum_{l1=1}^{L-1} \sum_{l2=l1+1}^{L} |(A)_{i,l1}(\underline{p})| \cdot |(A)_{i,l2}(\underline{p})| \cdot \left| \cos\left((l1-l2)\left(\frac{\pi(K-1)}{L} + \theta_1\right)\right) \right| \right)$$

$$\theta_2 = \underset{\theta}{\text{argmin}} \underset{i \in (1,2,\ldots,N)}{\max} \left( \sum_{j=1}^{L} |(A)_{i,j}(\underline{p}_1)|^2 + 2 \sum_{l1=1}^{L-1} \sum_{l2=l1+1}^{L} |(A)_{i,l1}(\underline{p}_1)| \cdot |(A)_{i,l2}(\underline{p}_1)| \cdot \left| \cos\left((l1-l2)\left(\frac{\pi(K-1)}{L} + \theta\right)\right) \right| \right)$$

Figure 10:
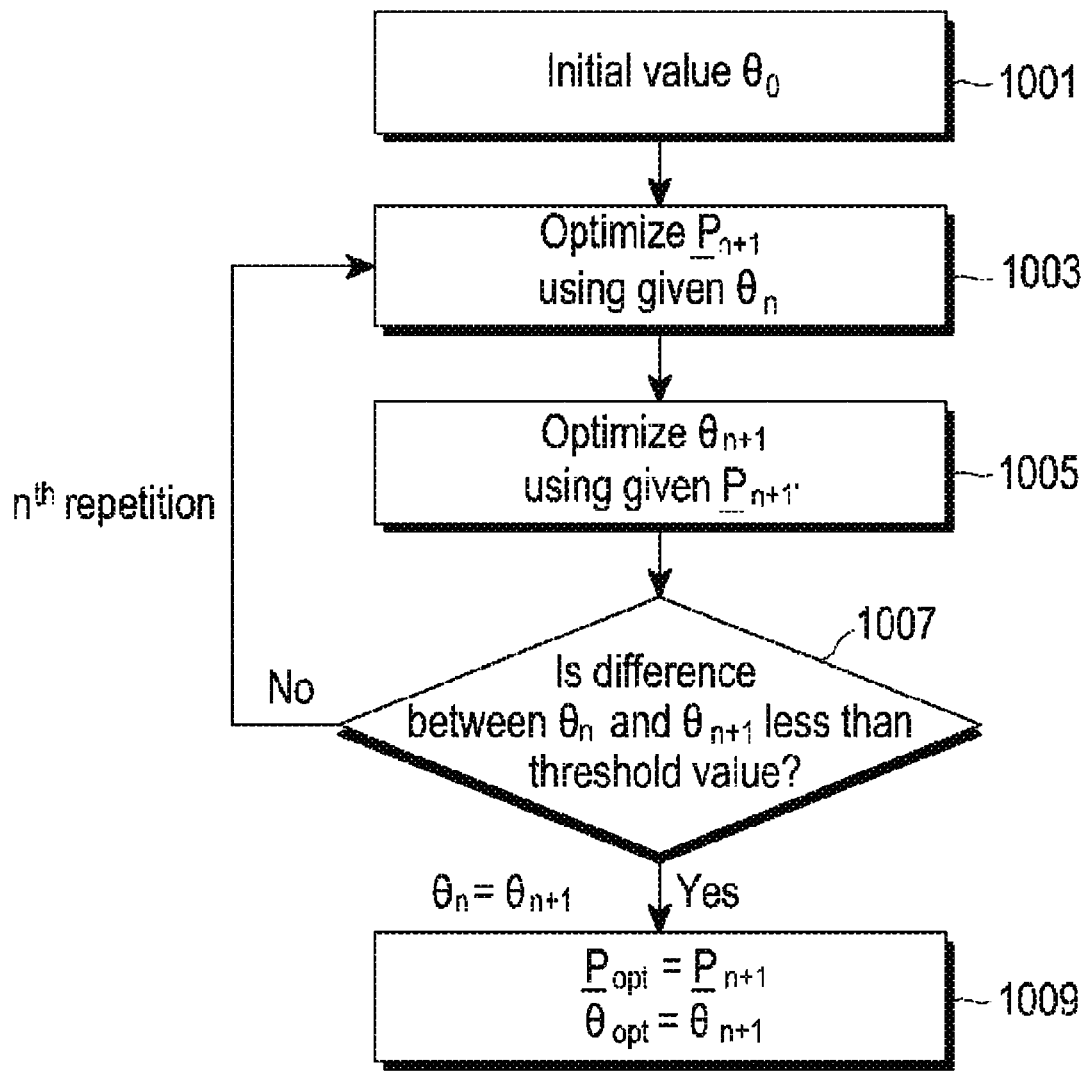
FIG. 10 is a flowchart illustrating a method of optimizing a filter value and a phase value in rotated constellation CFS-OFDM according to embodiments of the present disclosure.

Equation 16 briefly expresses an example of a case when a single repetition is performed, and the operation can be repeatedly performed until the optimal $\underline{p}$ and $\theta$ values are detected as shown in FIG. 10.

FIG. 10 is a flowchart illustrating a method of optimizing a filter value and a phase value in rotated constellation CFS-OFDM according to embodiments of the present disclosure.

Referring to FIG. 10, when an initial value of a phase value in operation 1001 is $\theta_0$, a filter value $P_{n+1}$ is optimized using a phase value $\theta_n$ obtained through an $n^{th}$ repetition in operation 1003. The phase value $\theta_n$ obtained through the $n^{th}$ repetition uses $\theta_0$ which is the initial value of the phase value in operation 1001 at an initial operation. The filter value $P_{n+1}$ can be optimized by Equation 16. In operation 1005, a phase value $\theta_{n+1}$ is optimized using a filter value $P_{n+1}$ obtained in operation 1003. In the same manner, the phase value $O_{n+1}$ can be optimized by Equation 16. In operations 1003 and 1005, the optimization of the filter value and the phase value can be performed until the difference between $\theta_n$ and $\theta_{n+1}$ becomes smaller than a predetermined threshold value in operation 1007. When the difference between $\theta_n$ and $\theta_{n+1}$ is smaller than the predetermined threshold value in operation 1007, $P_{n+1}$ and $\theta_{n+1}$ can be used as final optimal filter value and phase value, respectively, in operation 1009. The optimal filter value and the phase value are values that converge to at least locally optimal values.

When a BPSK modulation is used and the number L of data symbols to be transmitted through a single OFDM symbol is an even number, the phase value can be optimized to be $$\theta_{opt} = \pi\left(\frac{K-1}{L} \pm \frac{1}{2}\right).$$

The constellation rotation can be performed by applying a shift index (shiftindex) optimized in BPSK as shown in Equation 17 with respect to an element $(S)_{i,j}$ in a K-by-L circular filter matrix, as described in the embodiment of FIG. 8.

$$(\hat{S})_{i,j} = p_i e^{-j\frac{2\pi(i-1-shiftindex)(j-1)}{L}} \quad [\text{Equation 17}]$$

$$\text{where } shiftindex = \frac{K-1}{2} \pm \frac{L}{4}.$$

Also, when the front end of the circular filter 903 performs constellation rotation like the embodiment of FIG. 9, and BPSK is used as the constellation, the constellation rotator 901 can apply constellation rotation with respect to an L-by-1 data symbol vector $\underline{d}[n]$, as shown in Equation 18. Here, a phase value $$\theta_{opt} = \pi\left(\frac{K-1}{L} \pm \frac{1}{2}\right)$$

optimized in BPSK is used as a phase value $\theta$.

As another example, when a vector $$\begin{bmatrix} 1 \\ e^{j\theta} \\ e^{j2\theta} \\ \vdots \\ e^{j(L-1)\theta} \end{bmatrix}$$

is configured as a diagonal matrix in the constellation rotation as expressed in Equation 18, the diagonal matrix can be expressed by Equation 14 by combining with a matrix that embodies the spreader of the circular filter 801 in the embodiment of FIG. 8.

$$d[n] \odot \begin{bmatrix} 1 \\ e^{j\theta} \\ e^{j2\theta} \\ \vdots \\ e^{j(L-1)\theta} \end{bmatrix} \quad [\text{Equation 18}]$$

When a QPSK modulation is used and the number L of data symbols to be transmitted through a single OFDM symbol is an even number, the phase value can be optimized to be $$\theta_{opt} = \pi\left(\frac{K-1}{L} \pm \frac{1 \text{ or } 3}{4}\right).$$

The constellation rotation can be performed by applying a shift index (shiftindex) optimized in QPSK as shown in Equation 19 with respect to an element $(S)_{i,j}$ in a K-by-L circular filter matrix, as described in the embodiment of FIG. 8.

$$(\hat{S})_{i,j} = p_i e^{-j\frac{2\pi(i-1-shiftindex)(j-1)}{L}} \quad [\text{Equation 19}]$$

$$\text{where } shiftindex = \frac{K-1}{2} \pm \frac{L \text{ or } 3L}{8}$$

Also, when the front end of the circular filter 903 performs constellation rotation like the embodiment of FIG. 9, and QPSK is used as the constellation, the constellation rotator 901 can apply constellation rotation with respect to an L-by-1 data symbol vector $\underline{d}[n]$, as shown in Equation 18. Here, a phase value $$\theta_{opt} = \pi\left(\frac{K-1}{L} \pm \frac{1 \text{ or } 3}{4}\right)$$

optimized in QPSK is used as a phase value $\theta$.

In the present embodiment, the optimal phase value can have a different PAPR performance gain of the rotated constellation CFS-OFDM compared to the existing CFS-OFDM, based on a K value and an L value. In BPSK, when $$\theta_{opt} = \pi\left(\frac{K-1}{L} \pm \frac{1}{2}\right) \simeq 0 \text{ or } \pi,$$

a performance gain is small, and the performance gain is higher as the difference is higher. For example, when K=32 and L is 20 or 21, the performance gain can be low. In QPSK, when $$\theta_{opt} = \pi\left(\frac{K-1}{L} \pm \frac{1 \text{ or } 3}{4}\right) \simeq 0 \text{ or } \frac{\pi}{2},$$

a performance gain is small, and the performance gain is higher as the difference is higher. For example, when K=32 and L is 24 or 25, the performance gain can be small.

A method of adding a shift index (shiftindex) in shifted CFS-OFDM can also be applied to DFT-S-OFDM, and an optimal value is the same as the optimal value of rotated constellation CFS-OFDM when L is an even number. Therefore, in this instance, $$\theta_{opt} = \pi\left(\frac{K-1}{L} \pm \frac{1}{2}\right)$$

is used as an optimal phase value in BPSK, and $$\theta_{opt} = \pi\left(\frac{K-1}{L} \pm \frac{1 \text{ or } 3}{4}\right)$$

is used as an optimal phase value in QPSK.

Hereinafter, a solution for optimization (that is, a PAPR optimization condition) using a DFS-S-OFDM signal model will be described.

A DFT-S OFDM signal model can be expressed by Equation 20 as provided below.

$$\underline{x} = W_N^{\mathcal{H}} \begin{bmatrix} W_L \\ 0_{N-L \text{ by } L} \end{bmatrix} \underline{d} = A\underline{d} \quad \text{[Equation 20]}$$

In the case of BPSK, the PAPR optimization condition in the DFT-S-OFDM signal model can be expressed by Equation 21 as provided below.

$$\underset{\theta}{\text{minimize}} \quad \text{[Equation 21]}$$

$$\max_{i \in \{1,2,\cdots,N\}} \left( \sum_{j=1}^{L} |(A)_{i,j}|^2 + 2 \sum_{l1=1}^{L-1} \sum_{l2=l1+1}^{L} |(A)_{i,l1}| \cdot |(A)_{i,l2}| \cdot \right.$$

$$\left. \left| \cos\left((l1 - l2)\left(\frac{\pi(K-1)}{L} + \theta\right)\right)\right| \right)$$

In the case of QPSK, the PAPR optimization condition in the DFT-S OFDM signal model can be expressed by Equation 22 as provided below.

$$\underset{\theta}{\text{minimize}} \max_{i \in \{1,2,\cdots,N\}} \left( \sum_{j=1}^{L} |(A)_{i,j}|^2 + \quad \text{[Equation 22]} \right.$$

$$\left. 2 \sum_{l1=1}^{L-1} \sum_{l2=l1+1}^{L} |(A)_{i,l1}| \cdot |(A)_{i,l2}| \cdot \left| \cdot c(l1, l2) \right| \right)$$

$$c(l1, l2) \triangleq \max_{\psi \in \{0, \frac{\pi}{2}\}} \left| \cos\left((l1 - l2)\left(\frac{\pi(K-1)}{L} + \theta\right) + \psi\right) \right|$$

A method of optimizing a CFS-OFDM transmit waveform and a rotated constellation CFS-OFDM transmit waveform can be applied to K, L, and a constellation order (that is, a modulation order), and can be capable of designing a transmit waveform having an appropriate PAPR performance level depending on a field of utilization.

Hereinafter, a method of configuring information between a transmitting end and a receiving end of the rotated constellation CFS-OFDM, and of transferring the information according to embodiments of the present disclosure will be described from the perspective of an uplink.

For rotated constellation CFS-OFDM transmission of a terminal, a base station needs to inform the terminal of resource allocation related information. The information includes a combination value of (K, L, {p_m}, θ). That is, the information includes the number K of subcarriers to be allocated, the number L of data symbols to be used for configuring a single CSF-OFDM symbol, a circular filter coefficient corresponding thereto, and an optimal phase value. K can be utilized as a channel bonding factor in OFDMA that allows per-tone access. The combination of (K, L, {p_m}, θ) indicates that different L, {p_m}, and θ values can be allocated to a given K. For example, when 12 subcarrier resources are allocated based on K=12, L can be 8 or 10 (L=8 or L=10). In this instance, a filter coefficient and a phase value that make a PAPR be optimal can be different for each case. By taking into consideration an information storage space (that is, a memory) of a terminal, a filter coefficient and a phase value that make the PAPR be optimal can correspond to a single optimal value. Also, the base station can inform the terminal of the value (K, L, {p_m}, θ) itself. However, by providing granularity in view of the complexity of the embodiment, a limited number of optimal (K, L, {p_m}, θ) sets are agreed between the base station and the terminal (that is, prepared in advance as table information), and the base station can informationize only a corresponding index into a downlink control channel or the like and inform the terminal of the same. The table information can be managed by being integrated with an existing modulation and coding scheme (MCS) level. For example, with respect to an MCS to which BPSK or QPSK is applied, it can be defined that a ratio of L to K is 10:12, {p_m} is an RRC filter coefficient that uses roll-off of the corresponding ratio or a filter coefficient optimized for a PAPR, θ is a $$\theta_{opt} = \pi\left(\frac{K-1}{L} \pm \frac{1}{2}\right)$$

value for BPSK, and is a $$\theta_{opt} = \pi\left(\frac{K-1}{L} \pm \frac{1 \text{ or } 3}{4}\right)$$

value for QPSK, in a manner of one-to-one match. In this instance, when the base station reports, to the terminal through a control channel, only an MCS index and the number of allocated RBs for an uplink data transmission, the terminal can recognize L or K to be a (the number of allocated RBs×the number of subcarriers per RB) value according to the one-to-one relationship, and can perform an uplink transmission using a corresponding filter coefficient and a phase rotation value.

In the case of a terminal existing in a cellular IoT or an edge area of a cell, the class of the terminal is identified based on a coverage, and an MCS level for each class can be defined. In this instance, the (K, L, {p_m}, θ) value and the MCS level can be integrated as a single information transfer unit, and can be mapped and used as index information. That is, in a case in which the base station performs scheduling with respect to the terminal, when the base station transmits the index information through a downlink control channel or the like, the terminal reads the index information, generates and transmits a rotated constellation CFS-OFDM signal, and the base station can demodulate, based on the index information, a received signal through a reverse process.

Also, the uplink resource allocation can be allocated based on two references, that is, K and L values. That is, the allocation can be performed based on a K(>L) value to maintain intra-cell orthogonality. The allocation can be performed based on an L value by mitigating the orthogonality so that the amount of available resource increases and a multi-user reception scheme of a base station can be used. In this instance, IFFT resource mapping location information, which has been required in the existing DFT-S-OFDM, is also required. In the case of per-tone OFDMA, since a sub-channel number is assigned for each subcarrier, an accurate IFFT resource location to which a symbol spread through a circular filter is to be mapped can be identified when a reference number and a K value are obtained. Generally, the reference number can be a sub-channel number of a start sub carrier to which a first symbol after circular filter spreading is to be mapped. However, another number can be set as the reference number. Like an LTE uplink, a plurality of consecutive (e.g., 12) subcarriers can be defined as a single resource block (RB), and IFFT mapping information can be reported through an RB index. In this instance, a factor of CFS-OFDM that corresponds to the number of allocated RBs can be K or L.

Figure 11:
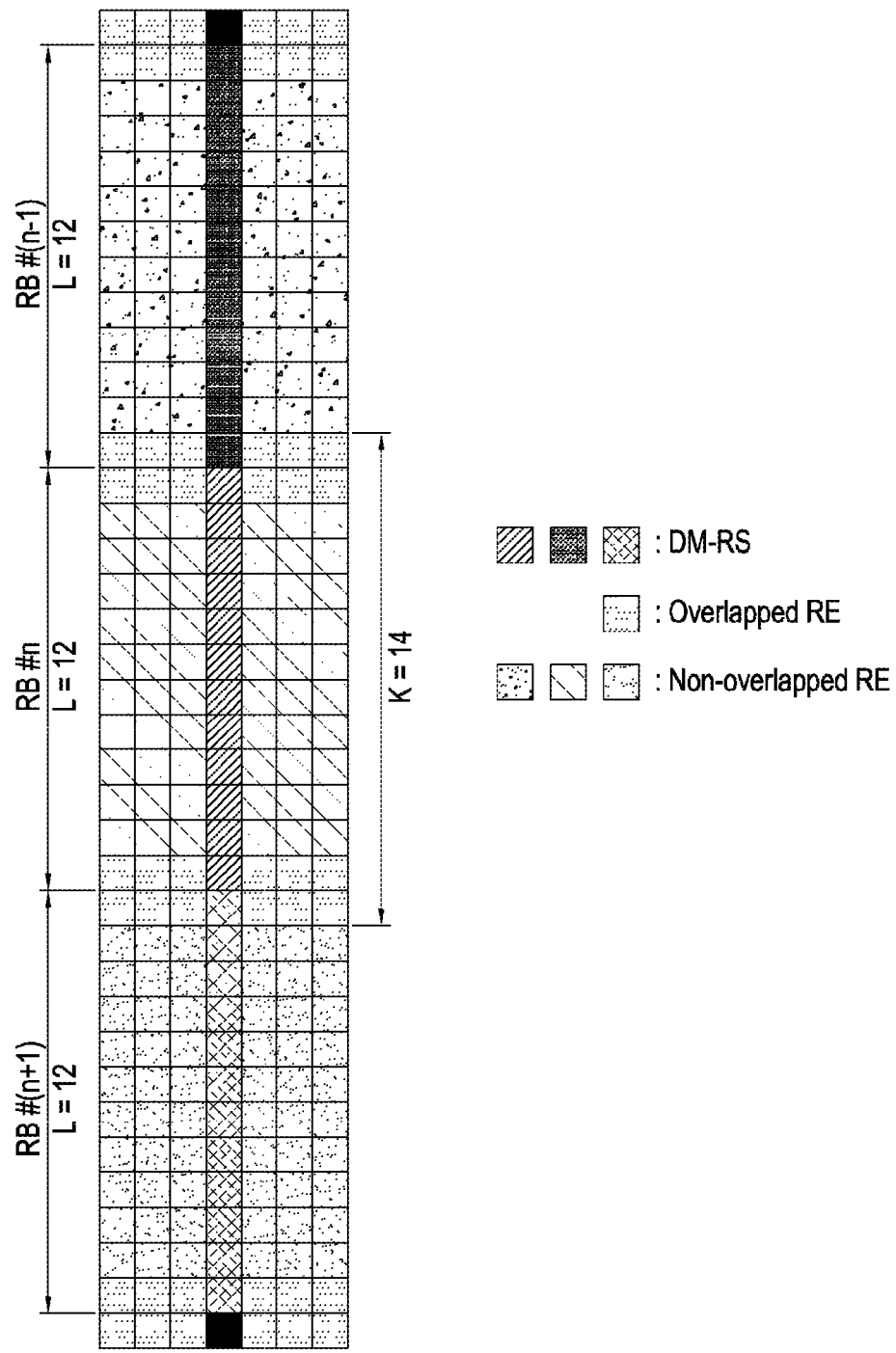
FIG. 11 illustrates an example of a method of allocating a resource in rotated constellation CFS-OFDM according to embodiments of the present disclosure.

Generally, when a multi-access is used that maintains orthogonality, (the number of allocated RBs)×(the number of subcarriers per RB)=K. However, when non-orthogonality multi-access is allowed, (the number of allocated RBs)×(the number of subcarriers per RB)=L. That is, (K–L) subcarrier resources can overlap among terminals that are assigned with neighboring resources, as illustrated in FIG. 11. In this instance, a channel estimation preamble, such as a DM-RS, is transmitted after L, as opposed to K, is set (that is, in the same manner as the LTE uplink) to prevent interference among terminals. In association with the channel estimation of a (K–L) resource area (that is, an area where resources of neighboring terminals overlap), an estimated value obtained by extrapolating a channel estimated value obtained through a DM-RS of each terminal can be applied to channel equalization of each terminal.

FIG. 11 illustrates a diagram illustrating an example of a resource allocation method in rotated constellation CFS-OFDM according to embodiments of the present disclosure. The example of FIG. 11 illustrates resource allocation (here, L=RB Size) with respect to three terminals in the case of 1 RB, K=14, and L=12.

In a case in which resource partial overlapping allowance of FIG. 11 is extended to per-one OFDMA, although a terminal is assigned with as much resource as a channel bonding factor K, transmission can be performed by limiting the location that carries a channel estimation preamble to L subcarrier areas within a subband. For example, a terminal that is assigned with resources based on K=5 and L=3 can perform transmission by loading a preamble into only three consecutive subcarriers out of 5 consecutive subcarriers in an OFDM symbol that needs to carry a channel estimation preamble. This can be an aggressive operation mode or a non-orthogonal operation mode that uses five resources to increase a spectrum usage rate and performs channel estimation using three resources out of the five resources, although it partially allows interference. Conversely, when a preamble is loaded into all of the 5 subcarriers and does not allow resource overlapping, this can be a conservative operation mode or an orthogonal operation mode.

In a case in which the base station performs scheduling with respect to terminals, when L is greater than K, an access bandwidth (BW) increases and a noise power increases in comparison with the same transmit power. Therefore, a CFS-OFDM reception SINR is converted by taking into consideration the above, and can be used as a standard for selecting a (K, L, $p_m$, θ) set and a resource allocation location. Also, a CFT-S-OFDM mode that does not require additional resource consumption can be included as a predetermined setting, and thus, selecting whether it is a DFT-S transmission or a CFS transmission, which is different from the DFT-S transmission, can be included. In this instance, when the SINR is converted, a PAPR threshold value that utilizes a CCDF, an available transmit power, a channel quality (CQI or MCS level), or the like can be considered.

An item that needs to be taken into consideration when designing a filter for circular filter spreading is a PAPR limit, a degree of securing orthogonality after the operation of a spreader and a de-spreader, SNR deterioration caused by a noise power from signal spreading, and the like. When an optimal filter coefficient is independently generated based on K and L values, an issue associated with a memory capacity for storing the same can be generated. Therefore, granularity can be applied to (K, L, $p_m$, θ) based on the complexity of the embodiment.

In a case of CFS-OFDM that uses an optimal transmit waveform based on a constellation, a PAPR performance can increase as the difference between K and L increases, except for predetermined sections. Also, a significantly great improvement in a PAPR performance can be shown in a low-order constellation, such as BPSK. By utilizing the above, an appropriate waveform can be considered from the perspective of a PAPR in various environments.

Figure 12:
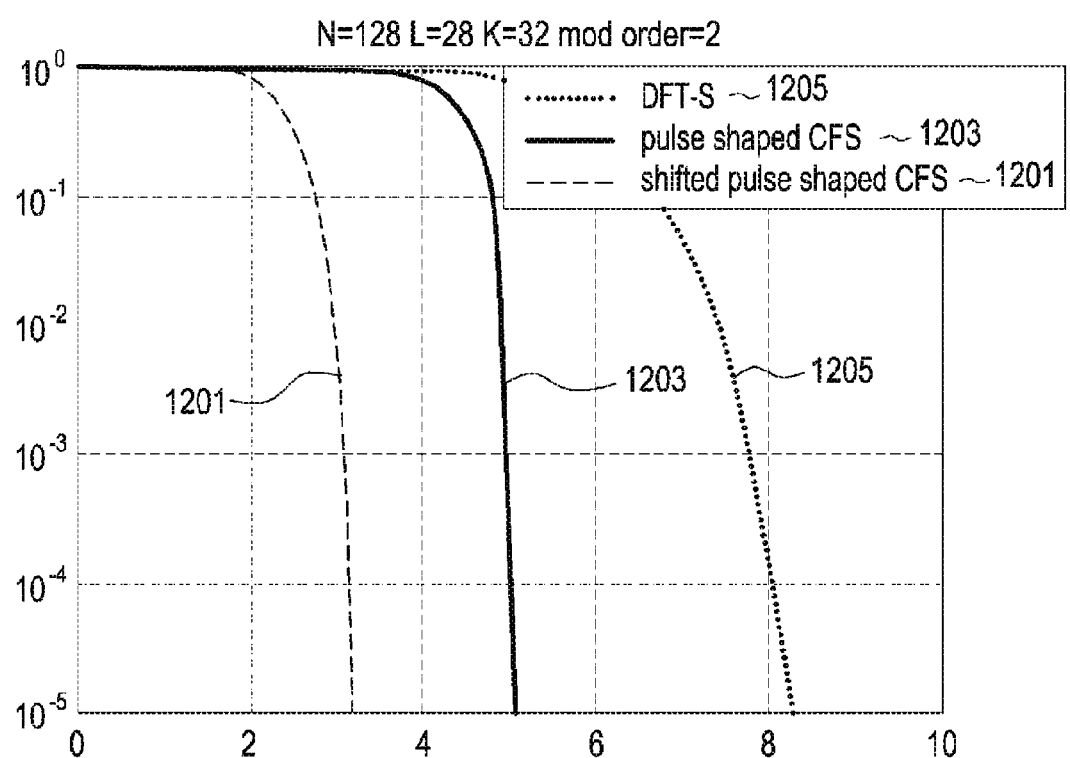
FIG. 12 illustrates a PAPR feature in rotated constellation CFS-OFDM according to embodiments of the present disclosure.

Therefore, according to embodiments of the present disclosure, in the case of a rotated constellation CFS-OFDM that uses an optimal transmit wave form and rotation based on a constellation, a PAPR performance increases as the difference between K and L increases. Therefore, it is determined that a trade-off between a resource and a PAPR exists. A significantly great improvement in a PAPR performance can be shown in a low constellation, such as BPSK. By utilizing the same, an appropriate waveform can be considered from the perspective of a PAPR in various environments. When constellation rotation, that is, an optimal shift index (shiftindex), such as rotated constellation CFS-OFDM, is applied to DFT-S OFDM, a PAPR performance can increase higher than conventional DFT-S OFDM as shown in the result of a simulation of FIG. 12. Reference numerals 1201, 1203, and 1205 of FIG. 12 illustrate rotated constellation CFS-OFDM (that is, shifted pulse shaped CFS), pulse shaped CFS, and a PAPR feature in existing DFT-S, respectively. In the case of the shifted pulse shaped CFS according to embodiments of the present disclosure, a PAPR performance can dramatically increase in comparison with existing DFT-S OFDM.

Also, Table 3 shows a comparison of a PAPR performance of the present disclosure with existing DFT-S OFDM and a case that uses an existing RRC pulse when BPSK is used. Table 4 shows a comparison of a PAPR performance of the present disclosure with existing DFT-S OFDM and a case that uses an existing RRC pulse when QPSK is used

TABLE 3

BPSK

| K | L | Roll-off Factor | Resource Utility | PAPR RRC [dB] (BPSK @ CCDF $10^{-4}$) | # of free variables | PAPR proposed filter [dB] (BPSK @ CCDF $10^{-4}$) | PAPR proposed shifted filter (BPSK @ CCDF $10^{-4}$) | PAPR Gain vs. RRC [dB] (proposed) | (proposed shifted) | PAPR Gain vs. DFT-S [dB] (proposed) | (proposed shifted) |
|---|---|---|---|---|---|---|---|---|---|---|---|
| 32 | 32 | 0 (=DFT-S) | 100% | 8.31 | 0 | 8.31 | 6.19 | Ref. | 2.12 | Ref. | 2.12 |
|    | 30 | 2/30 (=0.0667) | 93.80% |     | 1 | 6.88 | 4.48 |      |      | 1.43 | 3.83 |
|    | 28 | 4/28 (=0.1429) | 87.50% |     | 2 | 5.04 | 3.14 |      |      | 3.27 | 5.17 |
|    | 26 | 6/26 (=0.2308) | 81.30% |     | 3 | 3.3  | 2.08 |      |      | 6.01 | 6.23 |
|    | 24 | 8/24 (=0.3333) | 75.00% |     | 4 | 2.27 | 1.78 |      |      | 6.04 | 6.53 |
|    | 22 | 10/22 (=0.4545) | 68.80% |    | 5 | 2    | 1.7  |      |      | 6.31 | 6.61 |
|    | 20 | 12/20 (=0.6000) | 62.50% |    | 6 | 1.8  | 1.65 |      |      | 6.51 | 6.66 |
|    | 18 | 14/18 (=0.7778) | 56.30% |    | 7 | 2.46 | 1.64 |      |      | 5.85 | 6.67 |
|    | 16 | 16/16 (=1.0000) | 50.00% |    | 8 | 2.64 | 1.54 |      |      | 5.67 | 6.77 |

TABLE 4

QPSK

| K | L | Roll-off Factor | Resource Utility | PAPR RRC [dB] (QPSK @ CCDF $10^{-4}$) | # of free variables | PAPR proposed filter [dB] (QPSK @ CCDF $10^{-4}$) | PAPR proposed shifted filter [dB] (QPSK @ CCDF $10^{-4}$) | PAPR Gain vs. RRC [dB] (proposed) | (proposed shifted) | PAPR Gain vs. DFT-S [dB] (proposed) | (proposed shifted) |
|---|---|---|---|---|---|---|---|---|---|---|---|
| 32 | 32 | 0 (=DFT-S) | 100% | 7.71 | 0 | 7.71 | 7.47 | Ref. | 0.24 | Ref. | 0.24 |
|    | 30 | 2/30 (=0.0667) | 93.80% | 6.84 | 1 | 6.71 | 6.22 | 0.13 | 0.62 | 1 | 1.49 |
|    | 28 | 4/28 (=0.1429) | 87.50% | 5.7 | 2 | 5.35 | 5.15 | 0.35 | 0.55 | 2.36 | 2.56 |
|    | 26 | 6/26 (=0.2308) | 81.30% | 4.47 | 3 | 4.13 | 4.08 | 0.34 | 0.39 | 3.58 | 3.63 |
|    | 24 | 8/24 (=0.3333) | 75.00% | 3.43 | 4 | 3.12 | 3.1 | 0.31 | 0.33 | 4.59 | 4.61 |
|    | 22 | 10/22 (=0.4545) | 68.80% | 3.1 | 5 | 2.95 | 2.73 | 0.15 | 0.37 | 4.76 | 4.98 |
|    | 20 | 12/20 (=0.6000) | 62.50% | 3.3 | 6 | 2.94 | 2.63 | 0.36 | 0.62 | 4.77 | 5.08 |
|    | 18 | 14/18 (=0.7778) | 56.30% | 3.03 | 7 | 2.59 | 2.55 | 0.44 | 0.48 | 5.12 | 5.16 |
|    | 16 | 16/16 (=1.0000) | 50.00% | 3.52 | 8 | 2.74 | 2.48 | 0.78 | 1.04 | 4.97 | 5.23 |

Table 3 and Table 4 indicate that when a resource utility of 50% is used, that is, when K=32 and L=16, a PAPR performance gain of 6.77 dB can be obtained in comparison with the existing DFT-S OFDM in BPSK. A PAPR performance gain of 5.23 dB can be obtained in QPSK. When a resource utility of 75% (K=32, L=24) is used, BPSK obtains a PAPR performance gain of 6.53 dB, and QPSK obtains a PAPR performance gain of 4.61 dB, in comparison with the existing DFT-S OFDM. Therefore, according to the present disclosure, a PAPR performance can increase in comparison to CFS-OFDM that uses existing DFT-S OFDM and an existing RRC pulse.

FIGS. 13 to 16 are diagrams illustrating a PAPR feature in rotated constellation CFS-OFDM according to embodiments of the present disclosure, and shows that a PAPR performance is better than existing schemes such as CFS-OFDM and the like. RC-CFS-OFDM in FIGS. 13 to 16 indicates rotated constellation CFS-OFDM of the present disclosure. The result of the simulation of FIGS. 13 to 16 is obtained under the condition of Table 5 as provided below.

TABLE 5

Simulation conditions

Figure 13:
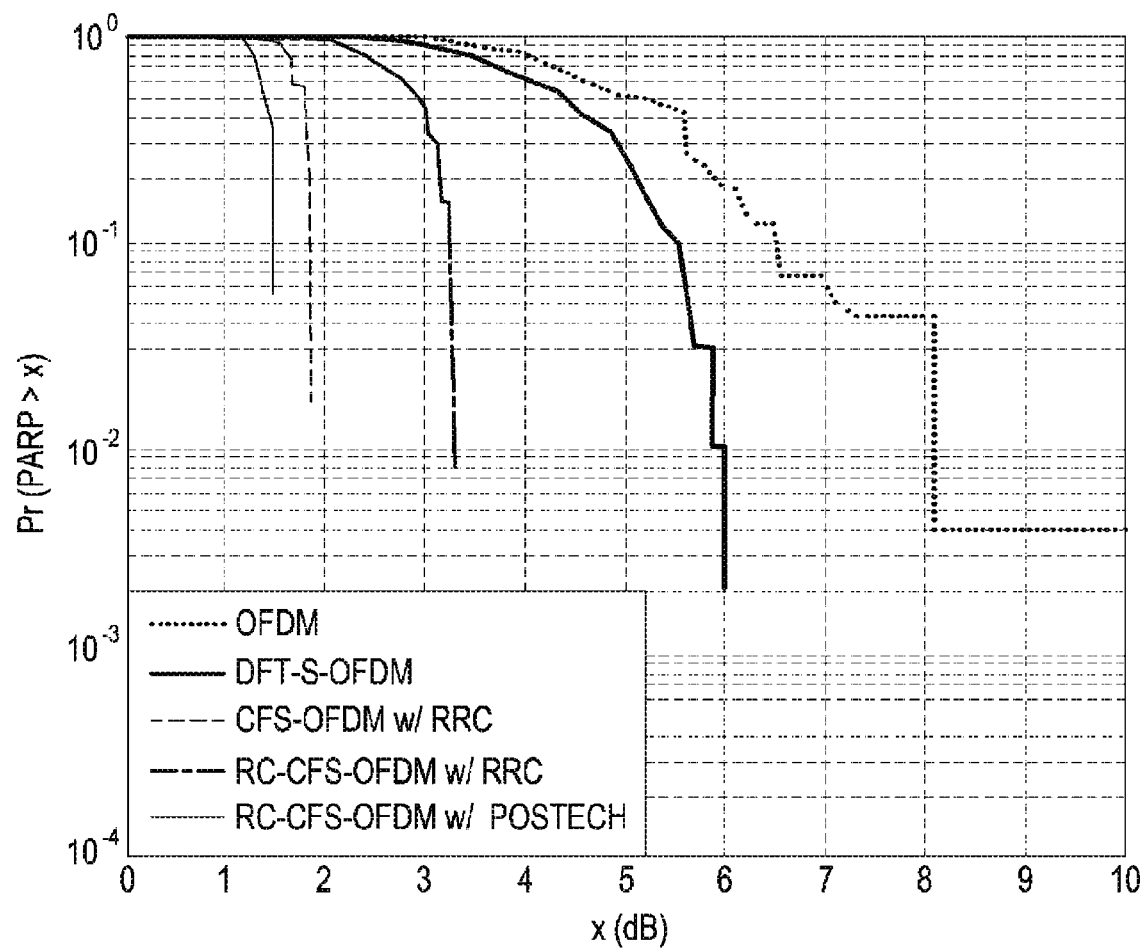
FIGS. 13 to 16 illustrate PAPR features in the rotated constellation CFS-OFDM according to embodiments of the present disclosure.

FIG. 13
CFS – OFDM w/ RRC: BPSK + CFS – OFDM

RC – CFS – OFDM w/ RRC: $\frac{\pi}{2}$ – BPSK + CFS – OFDM

RC – CFS – OFDM w/ RRC: BPSK join optimal phase/filter

K = 16, L = 10, N = 128 number of simulations: 1000000

TABLE 5-continued

Simulation conditions

Figure 14:
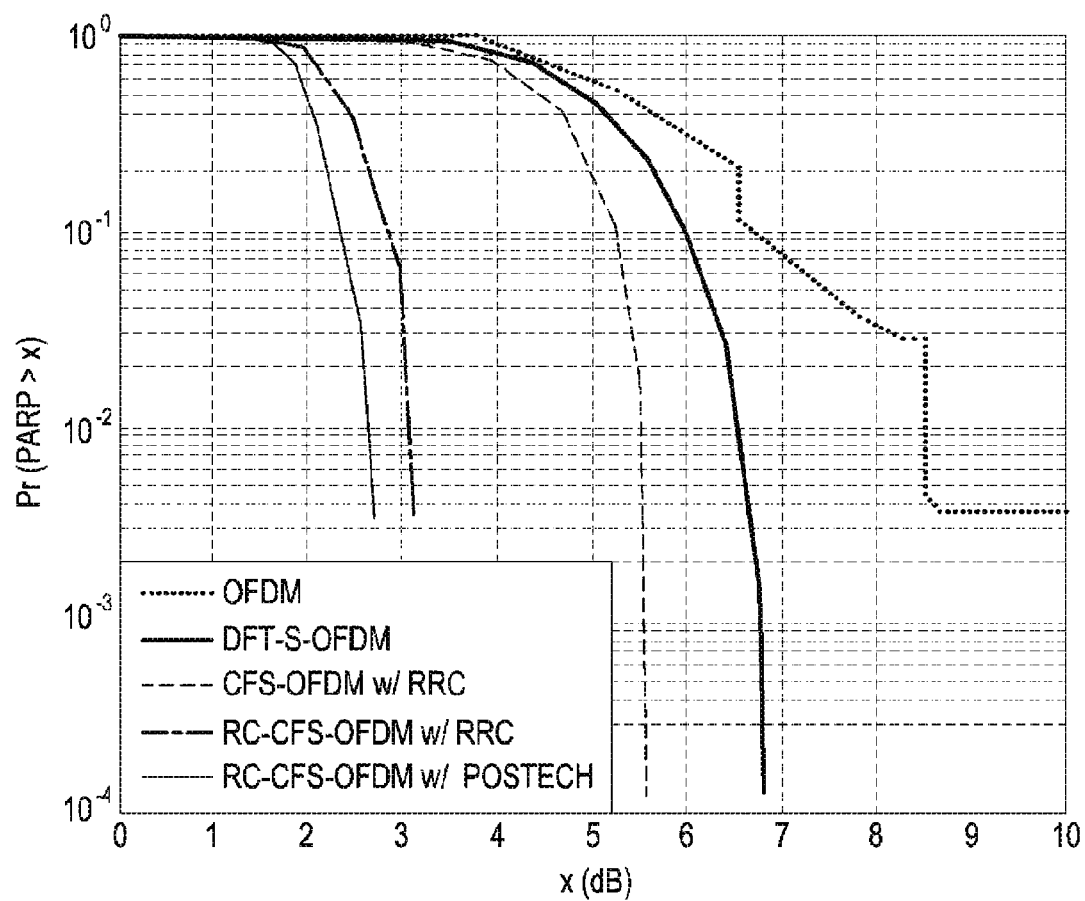
Figure 15:
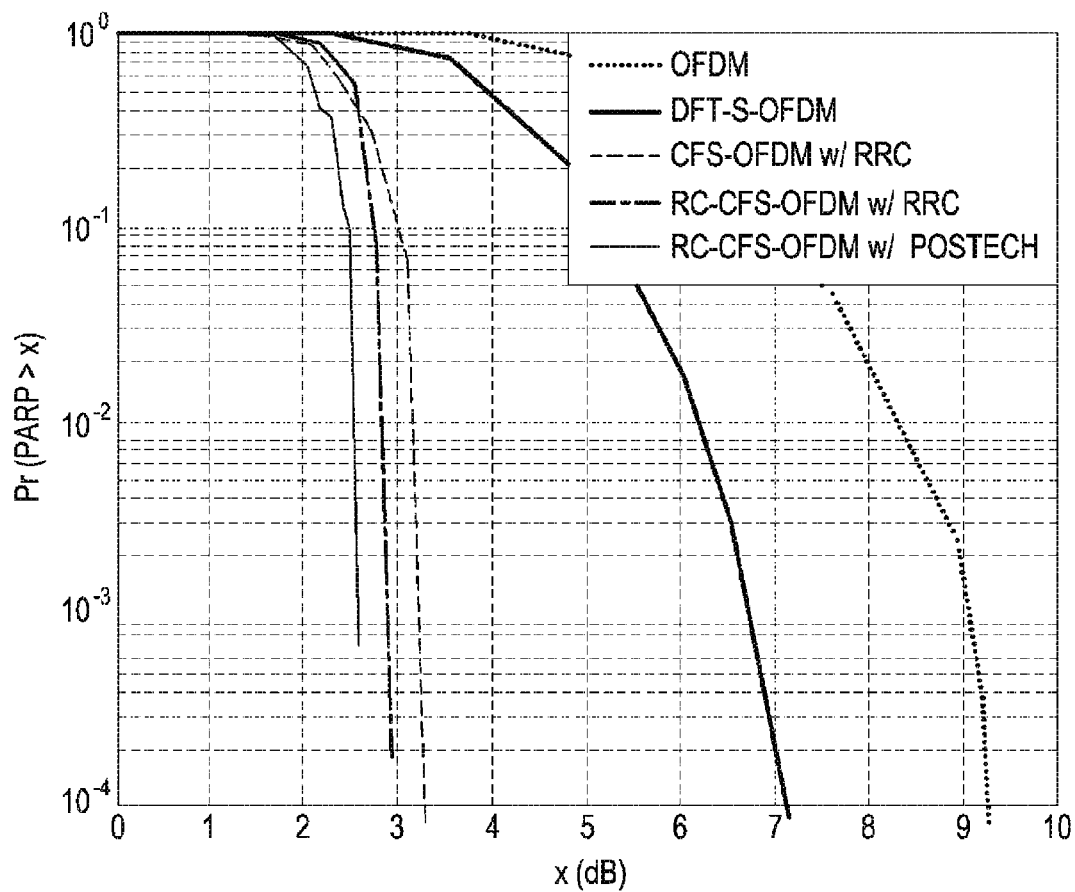
Figure 16:
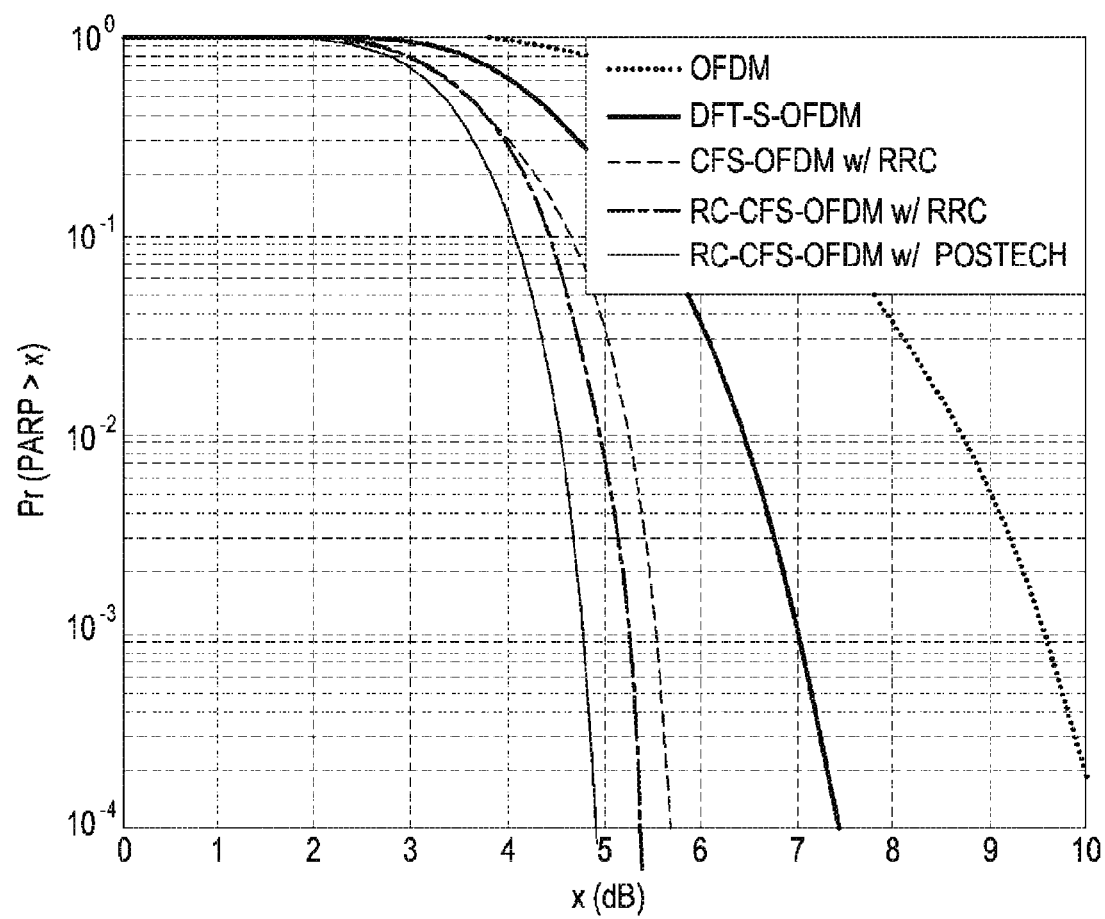

| | |
|---|---|
| FIG. 14 | CFS – OFDM w/ RRC: BPSK + CFS – OFDM |
| | RC – CFS – OFDM w/ RRC: $\frac{\pi}{2}$ – BPSK + CFS – OFDM |
| | RC – CFS – OFDM w/ RRC: BPSK join optimal phase/filter |
| | K = 16, L = 14, N = 128 |
| | number of simulations: 1000000 |
| FIG. 15 | CFS – OFDM w/ RRC: BPSK + CFS – OFDM |
| | RC – CFS – OFDM w/ RRC: $\frac{\pi}{4}$ – QPSK + CFS – OFDM |
| | RC – CFS – OFDM w/ RRC: QPSK join optimal phase/filter |
| | K = 16, L = 10, N = 128 |
| | number of simulations: 1000000 |
| FIG. 16 | CFS – OFDM w/ RRC: QPSK + CFS – OFDM |
| | RC – CFS – OFDM w/ RRC: $\frac{\pi}{4}$ – QPSK + CFS – OFDM |
| | RC – CFS – OFDM w/ RRC: QPSK join optimal phase/filter |
| | K = 16, L = 14, N = 128 |
| | number of simulations: 1000000. |

Meanwhile, exemplary embodiments of the present disclosure shown and described in this specification and the drawings correspond to specific examples presented in order to easily explain technical contents of the present disclosure, and to help comprehension of the present disclosure, but are not intended to limit the scope of the present disclosure. That is, it is apparent to those skilled in the art to which the present disclosure belongs that different modifications can be achieved based on the technical spirit of the present disclosure. Also, each embodiment may be used in combinations.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A transmission method for reducing a peak-to-average power ratio (PAPR) in an orthogonal frequency division multiplexing (OFDM) system, the method comprising:
performing a constellation rotation with respect to L input data symbols;
performing an L-point discrete Fourier transform (DFT) spreading and circular extension on the L constellation-rotated data symbols to be K symbols;
performing a frequency domain (FD) windowing processing by multiplying the K circular-extended data symbols by a circular filter coefficient; and
transmitting the processed data symbols,
wherein L denotes a number of data symbols to be transmitted through a single OFDM symbol, and K denotes a circular filter spreading (CFS)-OFDM spreading factor.

2. The method of claim 1, wherein, when binary phase shift keying (BPSK) is used as a constellation, an optimal phase value $\theta_{opt}$ for the constellation rotation is determined to be an equation provided below:

$$\theta_{opt} = \pi\left(\frac{K-1}{L} \pm \frac{1}{2}\right).$$

3. The method of claim 2, wherein the constellation rotation is performed by applying a shift index (shiftindex) optimized in the BPSK with respect to an element $(S)_{i,j}$ in a K-by-L circular filter matrix, as shown in an equation provided below:

$$(\hat{S})_{i,j} = p_i e^{-j\frac{2\pi(i-1-shiftindex)(j-1)}{L}}$$

$$\text{where shiftindex} = \frac{K-1}{2} \pm \frac{L}{4},$$

wherein i denotes a frequency index and j denotes a symbol index.

4. The method of claim 1, wherein, when QPSK is used as a constellation, an optimal phase value $\theta_{opt}$ for the constellation rotation is determined to be an equation provided below:

$$\theta_{opt} = \pi\left(\frac{K-1}{L} \pm \frac{1 \text{ or } 3}{4}\right),$$

wherein L denotes the number of data symbols to be transmitted through a single OFDM symbol, and K denotes a CFS-OFDM spreading factor.

5. The method of claim 4, wherein the constellation rotation is performed by applying a shift index (shiftindex) optimized in the QPSK with respect to an element $(S)_{i,j}$ in a K-by-L circular filter matrix, as shown in an equation provided below:

$$(\hat{S})_{i,j} = p_i e^{-j\frac{2\pi(i-1-shiftindex)(j-1)}{L}}$$

$$\text{where shiftindex} = \frac{K-1}{2} \pm \frac{L \text{ or } 3L}{8},$$

wherein i denotes a frequency index and j denotes a symbol index.

6. A transmitting apparatus in an orthogonal frequency division multiplexing (OFDM) system, the apparatus comprising:
a transmission module configured to:
perform a constellation rotation with respect to L input data symbols,
execute an L-point discrete DFT spreading and a circular extension on the L constellation-rotated data symbols to be K symbols, and
perform a frequency domain (FD) windowing processing by multiplying the K circular-extended data symbols by a circular filter coefficient,
wherein L denotes a number of data symbols to be transmitted through a single OFDM symbol, and K denotes a circular filter spreading (CFS)-OFDM spreading factor.

7. The apparatus of claim 6, wherein, when binary phase shift keying (BPSK) is used as a constellation, an optimal phase value $\theta_{opt}$ for the constellation rotation is determined to be an equation provided below:

$$\theta_{opt} = \pi\left(\frac{K-1}{L} \pm \frac{1}{2}\right).$$

8. The apparatus of claim 7, wherein the constellation rotation is performed by applying a shift index (shiftindex) optimized in the BPSK with respect to an element $(S)_{i,j}$ in a K-by-L circular filter matrix, as shown in an equation provided below:

$$(\hat{S})_{i,j} = p_i e^{-j\frac{2\pi(i-1-shiftindex)(j-1)}{L}}$$

$$\text{where shiftindex} = \frac{K-1}{2} \pm \frac{L}{4},$$

wherein i denotes a frequency index and j denotes a symbol index.

9. The apparatus of claim 6, wherein, when QPSK is used as a constellation, an optimal phase value $\theta_{opt}$ for the constellation rotation is determined to be an equation provided below:

$$\theta_{opt} = \pi\left(\frac{K-1}{L} \pm \frac{1 \text{ or } 3}{4}\right),$$

wherein L denotes the number of data symbols to be transmitted through a single OFDM symbol, and K denotes a CFS-OFDM spreading factor.

10. The apparatus of claim 9, wherein the constellation rotation is performed by applying a shift index (shiftindex) optimized in the QPSK with respect to an element $(S)_{i,j}$ in a K-by-L circular filter matrix, as shown in an equation provided below:

$$(\hat{S})_{i,j} = p_i e^{-j\frac{2\pi(i-1-shiftindex)(j-1)}{L}}$$

$$\text{where shiftindex} = \frac{K-1}{2} \pm \frac{L \text{ or } 3L}{8},$$

wherein i denotes a frequency index and j denotes a symbol index.

11. A method for operating a base station in an orthogonal frequency division multiplexing (OFDM) system, the method comprising:
performing a constellation rotation with respect to L input data symbols;
performing an L-point discrete Fourier transform (DFT) spreading and circular extension on the L constellation-rotated data symbols to be K symbols;
performing a frequency domain (FD) windowing processing by multiplying the K circular-extended data symbols by a circular filter coefficient; and
transmitting the FD window processing performed data symbols,
wherein L denotes a number of data symbols to be transmitted through a single OFDM symbol, and K denotes a circular filter spreading (CFS)-OFDM spreading factor.

12. The method of claim 11, wherein, when binary phase shift keying (BPSK) is used as a constellation, an optimal phase value for the constellation rotation is determined to be an equation provided below:

$$\theta_{opt} = \pi\left(\frac{K-1}{L} \pm \frac{1}{2}\right).$$

13. The method of claim 12, wherein the constellation rotation is performed by applying a shift index (shiftindex) optimized in the BPSK with respect to an element $(S)_{i,j}$ in a K-by-L circular filter matrix, as shown in an equation provided below:

$$(\hat{S})_{i,j} = p_i e^{-j\frac{2\pi(i-1-shiftindex)(j-1)}{L}}$$

$$\text{where shiftindex} = \frac{K-1}{2} \pm \frac{L}{4},$$

wherein i denotes a frequency index and j denotes a symbol index.

14. The method of claim 11, wherein, when QPSK is used as a constellation, an optimal phase value $\theta_{opt}$ for the constellation rotation is determined to be an equation provided below:

$$\theta_{opt} = \pi\left(\frac{K-1}{L} \pm \frac{1 \text{ or } 3}{4}\right),$$

wherein L denotes the number of data symbols to be transmitted through a single OFDM symbol, and K denotes a CFS-OFDM spreading factor.

15. The method of claim 14, wherein the constellation rotation is performed by applying a shift index (shiftindex) optimized in the QPSK with respect to an element $(S)_{i,j}$ in a K-by-L circular filter matrix, as shown in an equation provided below:

$$(\hat{S})_{i,j} = p_i e^{-j\frac{2\pi(i-1-shiftindex)(j-1)}{L}}$$

$$\text{where shiftindex} = \frac{K-1}{2} \pm \frac{L \text{ or } 3L}{8},$$

wherein i denotes a frequency index and j denotes a symbol index.

16. A base station for an orthogonal frequency division multiplexing (OFDM) system, the base station comprising:
a controller configured to:
perform a constellation rotation with respect to L input data symbols,
execute an L-point discrete DFT spreading and a circular extension on the L constellation-rotated data symbols to be K symbols, and
perform a frequency domain (FD) windowing processing by multiplying the K circular-extended data symbols by a circular filter coefficient; and
a transceiver configured to transmit the FD window processing performed data symbols,
wherein L denotes a number of data symbols to be transmitted through a single OFDM symbol, and K denotes a circular filter spreading (CFS)-OFDM spreading factor.

17. The base station of claim 16, wherein, when binary phase shift keying (BPSK) is used as a constellation, an optimal phase value for the constellation rotation is determined to be an equation provided below:

$$\theta_{opt} = \pi\left(\frac{K-1}{L} \pm \frac{1}{2}\right).$$

18. The base station of claim 17, wherein the constellation rotation is performed by applying a shift index (shiftindex) optimized in the BPSK with respect to an element $(S)_{i,j}$ in a K-by-L circular filter matrix, as shown in an equation provided below:

$$(\hat{S})_{i,j} = p_i e^{-j\frac{2\pi(i-1-shiftindex)(j-1)}{L}}$$
$$\text{where shiftindex} = \frac{K-1}{2} \pm \frac{L}{4},$$

wherein i denotes a frequency index and j denotes a symbol index.

19. The base station of claim 16, wherein, when QPSK is used as a constellation, an optimal phase value $\theta_{opt}$ for the constellation rotation is determined to be an equation provided below:

$$\theta_{opt} = \pi\left(\frac{K-1}{L} \pm \frac{1 \text{ or } 3}{4}\right),$$

wherein L denotes the number of data symbols to be transmitted through a single OFDM symbol, and K denotes a CFS-OFDM spreading factor.

20. The base station of claim 19, wherein the constellation rotation is performed by applying a shift index (shiftindex) optimized in the QPSK with respect to an element $(S)_{i,j}$ in a K-by-L circular filter matrix, as shown in an equation provided below:

$$(\hat{S})_{i,j} = p_i e^{-j\frac{2\pi(i-1-shiftindex)(j-1)}{L}}$$
$$\text{where shiftindex} = \frac{K-1}{2} \pm \frac{L \text{ or } 3L}{8},$$

wherein i denotes a frequency index and j denotes a symbol index.

* * * * *